US 6,674,712 B1

(12) United States Patent
Yang et al.

(10) Patent No.: US 6,674,712 B1
(45) Date of Patent: Jan. 6, 2004

(54) DEVICE AND METHOD FOR GENERATING QUATERNARY COMPLEX QUASI-ORTHOGONAL CODE AND SPREADING TRANSMISSION SIGNAL USING QUASI-ORTHOGONAL CODE IN CDMA COMMUNICATION SYSTEM

(75) Inventors: Kyeong-Cheol Yang, Seoul (KR); Jae-Yoel Kim, Kunpo-shi (KR); Hee-Won Kang, Seoul (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/391,731

(22) Filed: Sep. 8, 1999

(30) Foreign Application Priority Data

Sep. 8, 1998 (KR) ............................................. 98-37453
Dec. 9, 1998 (KR) ............................................. 98-54569

(51) Int. Cl.[7] .............................................. H04J 11/00
(52) U.S. Cl. ...................................... 370/208; 370/320
(58) Field of Search ............................... 370/203, 208, 370/209, 320; 375/130, 140, 141

(56) References Cited

U.S. PATENT DOCUMENTS

| 3,715,508 | A | * | 2/1973 | Blasbalg ...................... 370/203 |
| 5,103,459 | A | | 4/1992 | Gilhousen et al. |
| 5,799,010 | A | * | 8/1998 | Lomp et al. ................ 370/335 |
| 6,147,964 | A | * | 11/2000 | Black et al. ................. 370/209 |
| 6,317,422 | B1 | * | 11/2001 | Khaleghi et al. ........... 370/208 |
| 6,324,159 | B1 | * | 11/2001 | Mennekens et al. ........ 370/203 |
| 6,324,171 | B1 | * | 11/2001 | Lee et al. .................... 370/206 |
| 6,370,669 | B1 | * | 4/2002 | Eroz et al. ................... 714/774 |
| 6,377,539 | B1 | * | 4/2002 | Kang et al. .................. 370/203 |

OTHER PUBLICATIONS

Bar–David, Barker. Code Position Modulation for high rate communication in the ISM bands. Spectrum Techniques and Applications Proceedings, 1996., IEEE 4th International Symposium on , vol.: 3, 1996, pp.: 1198–1202 vol. 3.*

* cited by examiner

Primary Examiner—Hassan Kizou
Assistant Examiner—Dmitry Levitan
(74) Attorney, Agent, or Firm—Dilworth & Barrese, LLP

(57) ABSTRACT

A method for generating a quaternary complex quasi-orthogonal code in a CDMA communication system is disclosed. The method comprises generating an M-sequence and then generating specific sequences having a good full correlation property with the M-sequence; generating a column permutation function for converting the M-sequence to a Walsh code; generating candidate masks by column shifting the specific sequences with the column permutation function; generating quasi-orthogonal code representatives by operating the candidate masks and the Walsh codes having the same length as that of the candidate masks; and selecting a quasi-orthogonal code satisfying a partial correlation with the Walsh codes, out of the generated quasi-orthogonal code representatives, and selecting a mask related to generation of the selected quasi-orthogonal code.

23 Claims, 11 Drawing Sheets $$Q = \begin{bmatrix} 0 & 0 & 0 & 0 & 0 & 0 & \ldots & 0 & 0 \\ 0 & & & S_0(t) & & & & & \\ 0 & & & S_0(t+1) & & & & & \\ \vdots & & & \vdots & & & & & \\ 0 & & & S_0(t+2^m-2) & & & & & \\ 0 & & & S_1(t) & & & & & \\ 0 & & & S_1(t+1) & & & & & \\ \vdots & & & \vdots & & & & & \\ 0 & & & S_1(t+2^m-2) & & & & & \\ 0 & & & S_2(t) & & & & & \\ 0 & & & S_2(t+1) & & & & & \\ \vdots & & & \vdots & & & & & \\ 0 & & & S_{2^m-1}(t) & & & & & \\ 0 & & & S_{2^m-1}(t+1) & & & & & \\ \vdots & & & \vdots & & & & & \\ 0 & & & S_{2^m-1}(t+2^m-2) & & & & & \end{bmatrix}$$

FIG.3

$$Q' = \begin{bmatrix} \overbrace{e_0 + W}^{\frac{2^m}{W}} \\ e_1 + W \\ \vdots \\ e_{2^m-1} + W \end{bmatrix} \Bigg\} 2^m \times 2^m$$

FIG.4

DEVICE AND METHOD FOR GENERATING QUATERNARY COMPLEX QUASI-ORTHOGONAL CODE AND SPREADING TRANSMISSION SIGNAL USING QUASI-ORTHOGONAL CODE IN CDMA COMMUNICATION SYSTEM

PRIORITY

This application claims priority to an application entitled "Device and Method for Generating Quaternary Complex Quasi-orthogonal Code in CDMA Communication System" filed in the Korean Industrial Property Office on Sep. 8, 1998 and assigned Serial No. 98-37453, as well as an application filed in the Korean Industrial Property Office on Dec. 9, 1998, and assigned Serial No. 98-54569; the contents of both are hereby incorporated by reference.

BACKGROUND OF THE INVENTION

1. Field of the Invention

The present invention relates generally to a coding device and method for a mobile communication system, and in particular, to a device and method for generating quaternary complex quasi-orthogonal codes and then using those generated quaternary complex quasi-orthogonal codes to generate spreading channel signals.

2. Description of the Related Art

In general, a CDMA (Code Division Multiple Access) mobile communication system performs channel separation using orthogonal codes in order to increase channel capacity. For example, a forward link specified by the IS-95/IS-95A standard separates the channels using the orthogonal codes. This channel separation method can also be applied to a reverse link through time alignment.

FIG. 1 illustrates the IS-95/IS-95A forward link in which channels are separated by orthogonal codes. Referring to FIG. 1, channels are separated by associated orthogonal codes Wi (where i=0 to 63), respectively, which typically are Walsh codes. The IS-95/IS-95A forward link uses convolutional codes having a code rate R=1/2, employs BPSK (Binary Phase Shift Keying) modulation, and has a bandwidth of 1.2288 MHz. Accordingly, the number of available channels is 1.2288 MHz/(9.6 KHz*2)=64. That is, the IS-95/IS-95A forward link can separate channels using 64 Walsh codes.

As stated above, the number of available orthogonal codes depends on the employed modulation method and the minimum data rate. However, in future CDMA mobile communication systems, channels assigned to the users will increase in number in order to improve performance. To this end, future CDMA mobile communication systems will need to increase the channel capacity of traffic channels, pilot channels and control channels.

However, there are a limited number of available orthogonal codes the improved system can use. Therefore, any increase in channel capacity will be restricted due to the limitation on the number of available orthogonal codes. To solve this problem, it is desirable to generate quasi-orthogonal codes, which will have the least interference with the orthogonal codes and a variable data rate.

SUMMARY OF THE INVENTION

It is, therefore, an object of the present invention to provide a device and method for generating quasi-orthogonal code masks for generating quaternary complex quasi-orthogonal codes which have the least interference with orthogonal codes being used in a CDMA communication system.

It is another object of the present invention to provide a device and method for generating quasi-orthogonal codes for channel separation using quasi-orthogonal code masks and Walsh orthogonal codes in a QPSK (Quaternary Phase Shift Keying) CDMA communication system.

It is a further object of the present invention to provide a device and method for spreading channel signals using quaternary complex quasi-orthogonal codes in a CDMA communication system.

It is still another object of the present invention to provide a device and method for generating quasi-orthogonal code masks for generating quaternary complex quasi-orthogonal codes, selecting one of the quasi-orthogonal code masks to generate quasi-orthogonal codes and spreading channel signals to be transmitted using the generated quasi-orthogonal codes.

In one embodiment of the present invention, a method for generating a quaternary complex quasi-orthogonal code in a CDMA communication system comprises generating an M-sequence and specific sequences having the same length and a good full correlation property with the M-sequence; generating candidate masks by column permutation, in the same manner as a column permutation that converts the M-sequence to a Walsh code, of specific sequences; generating quasi-orthogonal code representatives by operating the candidate masks and Walsh codes having the same length as that of the candidate masks; and selecting a quasi-orthogonal code satisfying a partial correlation with the Walsh codes, out of the generated quasi-orthogonal code representatives, and selecting a mask related to generation of the selected quasi-orthogonal code.

In another embodiment of the present invention, a channel transmission device for a CDMA communication system comprises a complex signal converter for converting a channel coded signal to a complex signal; a generator including a quaternary complex quasi-orthogonal code mask, for generating a quaternary complex quasi-orthogonal code by operating the quaternary complex quasi-orthogonal code mask to a Walsh code; a channel spreader for generating a channel spread signal by operating the converted complex signal and the quaternary complex quasi-orthogonal code; and a PN masking part for generating a PN masked channel signal by operating the channel spread complex signal and complex PN sequence.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a matrix Q for quasi-orthogonal code candidate masks used in generating quaternary complex quasi-orthogonal codes according to an embodiment of the present invention;

FIG. 4 is a diagram illustrating a matrix Q' for quaternary complex quasi-orthogonal code candidates generated by operating candidate masks for quasi-orthogonal codes and Walsh orthogonal codes according to an embodiment of the present invention;

DETAILED DESCRIPTION OF THE PREFERRED EMBODIMENT

Figure 1:
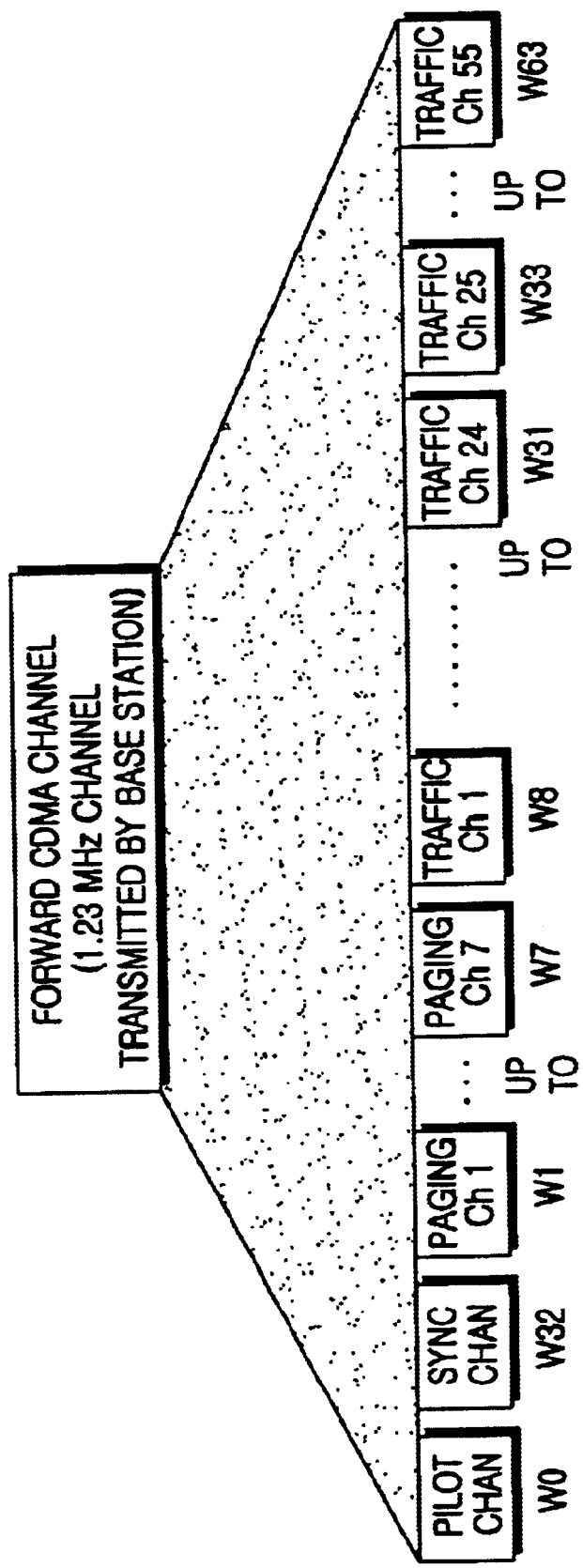
FIG. 1 is a diagram illustrating channel separation using orthogonal codes in a CDMA communication system.

A preferred embodiment of the present invention will be described herein below with reference to the accompanying drawings. In the following description, well-known functions or constructions are not described in detail since they would obscure the invention in unnecessary detail.

The invention aims to generate quasi-orthogonal codes which have the least interference with orthogonal codes, in order to increase the channel capacity or maximize the capacity of a single cell in a CDMA communication system by increasing the channelization code.

Quasi-orthogonal sequences can be generated from Kasami sequences, Gold sequences and Kerdock sequences. These sequences have a common feature that a sequence can be expressed as the sum of sequences having a good (or high) correlation property between PN (Pseudo-Noise) sequences and the sequences. For this reason, the above sequences can be used in generating quasi-orthogonal codes. Walsh codes can be obtained by performing column permutation for PN sequences. If a sequence comprised of the sum of a certain sequence and PN sequences undergoes column permutation in the same manner as said column permutation for the specific sequences, the column permuted sequence will maintain a good correlation property with the Walsh code. That is, since the two sequences having the good correlation property have equally undergone column permutation, the good correlation property can remain unchanged in terms of the whole length of the sequences. A sequence remaining after exclusion of the PN sequence from the two sequences can be given as a candidate mask family for a quasi-orthogonal code, which will be described hereafter. When this sequence is given as a candidate mask family for a quasi-orthogonal code, the full correlation property is basically satisfied.

Below, a detailed description will be made of a procedure for generating complex quasi-orthogonal codes using the Kerdock sequences (i.e., Family A sequences) out of the sequences having the above feature.

Complex quasi-orthogonal codes should satisfy the following conditions expressed by Equations (1) to (3).

$$\left| \sum_{t=1}^{N} j^{S_i(t)+2W_k(t)} \right| \leq \theta_{min}(N) \quad \langle \text{Condition 1} \rangle \tag{1}$$

$$\left| \sum_{t=1}^{N} j^{S_i(t)+S'_i(t)} \right| \leq \theta_{min}(N) \quad \langle \text{Condition 2} \rangle \tag{2}$$

$$\left| \sum_{t=1+(\frac{N}{M}l)}^{\frac{N}{M}(l+1)} j^{S_i(t)+2W_k(t)} \right| \leq \theta_{min}\left(\frac{N}{M}\right) \quad \langle \text{Condition 3} \rangle \tag{3}$$

In addition, it is preferable that the complex orthogonal codes partially satisfy the following condition expressed by Equation (4).

$$\left| \sum_{t=1+(\frac{N}{M}l)}^{\frac{N}{M}(l+1)} j^{S_i(t)+S'_i(t)} \right| \leq \theta_{min}\left(\frac{N}{M}\right) \quad \langle \text{Condition 4} \rangle \tag{4}$$

where $i=0,1,2,\ldots,M-1$, and $j=\sqrt{-1}$.

In Equations (1) to (4), $W_k(t)$ denotes the k-th sequence of a Walsh orthogonal code having length N ($1 \leq k \leq N$) and $S_i(t)$ denotes an i-th complex quasi-orthogonal code having length N ($1 \leq i \leq X$), where X denotes the number of quasi-orthogonal codes satisfying Conditions 1 to 3 and partially satisfying Condition 4. Condition 1 expressed by Equation (1) means that the full correlation between the k-th orthogonal code $W_k(t)$ ($1 \leq k \leq N$, $1 \leq t \leq N$) and the i-th quasi-orthogonal code $S_i(t)$ ($1 \leq i \leq N$, $1 \leq t \leq N$) should not exceed $\theta_{min}(N)$. Condition 2 expressed by Equation (2) means that the full correlation between an i-th line and an i'-th line of a quasi-orthogonal code should not exceed $\theta_{min}(N)$. Condition 3 expressed by Equation (3) means that a partial correlation should not exceed $$\theta_{min}\left(\frac{N}{M}\right),$$

when the partial correlation is taken for respective parts $$\frac{N}{M}$$

obtained by dividing, by M, the length N of a k-th line of an orthogonal code and an i-th line of a quasi-orthogonal code, where $M=2^m$, $m=0,1,\ldots,\log_2 N$.

Here, Condition 1 of Equation (1) represents the full correlation property of a Walsh orthogonal code and a quaternary complex quasi-orthogonal code, and means the minimum correlation value that a quaternary complex quasi-orthogonal code can have theoretically as an absolute correlation value with a Walsh orthogonal code, wherein $\theta_{min}(N)=\sqrt{N}$, where N is the length of the code. Condition 2 of Equation (2) represents a condition for a full correlation property between quaternary complex quasi-orthogonal codes. Condition 3 of Equation (3) represents a partial correlation property between a Walsh orthogonal code and a quaternary complex quasi-orthogonal code. Condition 4 of Equation (4) represents a partial correlation property between quaternary complex quasi-orthogonal codes.

Figure 2:
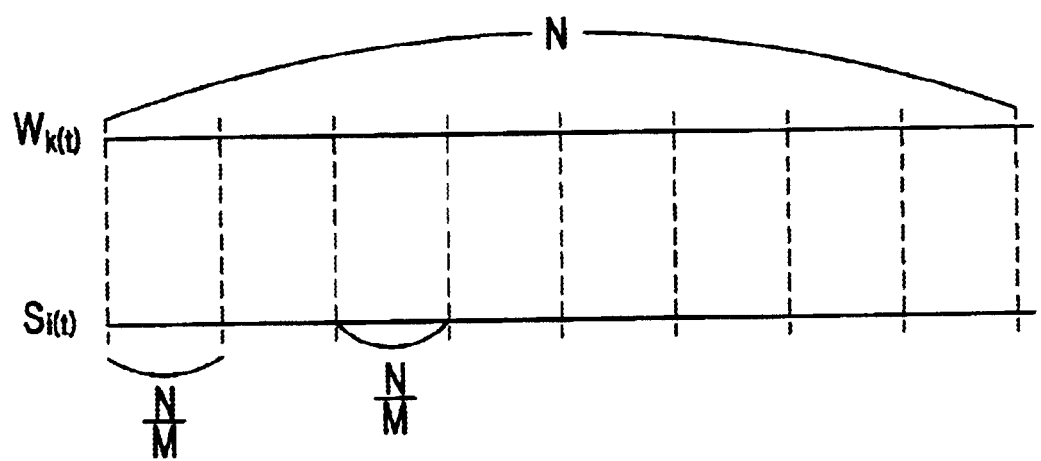
FIG. 2 is a diagram illustrating a partial correlation between a Walsh code and a quasi-orthogonal code.

FIG. 2 is a diagram for explaining a method for taking a partial correlation between a quaternary complex quasi-orthogonal code and a Walsh orthogonal code, wherein $M=2^a$ ($0 \leq a \leq \log_2 N$). During a data service, if the data rate increases, N/M parts of the orthogonal code are transmitted at a time. The partial correlation satisfies a correlation property at this moment. For example, when $$N = 256, \quad \theta_{min}\left(\frac{N}{M}\right)$$

values are shown in Table 1. Condition 4 represents a partial correlation between quasi-orthogonal codes, and correlation property values $$\theta_{min}\left(\frac{N}{M}\right)$$

are identical to those in Condition 3.

TABLE 1

| N = 256 | M = 1 | $\theta_{min}(N) = 16$ |
|---|---|---|
| N = 256 | M = 2 | $\theta_{min}\left(\frac{N}{M}\right) = 8\sqrt{2}$ |
| N = 256 | M = 4 | $\theta_{min}\left(\frac{N}{M}\right) = 8$ |
| N = 256 | M = 8 | $\theta_{min}\left(\frac{N}{M}\right) = 4\sqrt{2}$ |
| N = 256 | M = 16 | $\theta_{min}\left(\frac{N}{M}\right) = 4$ |
| N = 256 | M = 32 | $\theta_{min}\left(\frac{N}{M}\right) = 2\sqrt{2}$ |
| N = 256 | M = 64 | $\theta_{min}\left(\frac{N}{M}\right) = 2$ |

The results of Table 1 can be generally extended. For example, when N=1024 and M=2, the partial correlation between an orthogonal code and a quasi-orthogonal code is calculated at a half of the full length, in this case, length 512, and a partial correlation bound of this is equal to a full correlation bound $\theta_{min}(N)$ of length 512. Table 2 shows the relationship between the length N and the minimum correlation value $\theta_{min}(N)$.

TABLE 2

| N = 2048 | $\theta_{min}(N) = 32\sqrt{2}$ |
|---|---|
| N = 1024 | $\theta_{min}(N) = 32$ |
| N = 512 | $\theta_{min}(N) = 16\sqrt{2}$ |
| N = 256 | $\theta_{min}(N) = 16$ |
| N = 128 | $\theta_{min}(N) = 8\sqrt{2}$ |
| N = 64 | $\theta_{min}(N) = 8$ |
| N = 32 | $\theta_{min}(N) = 4\sqrt{2}$ |

Sequences satisfying Conditions 1 and 2 include Kasami sequences, Gold sequences and Kerdock sequences. That is, all of these sequence families have a good cross correlation property. A full correlation property for the above sequence families is well known.

However, research has not been conducted to provide a sequence satisfying Condition 3. However, it is very important for the IS-95B standard or the future CDMA system supporting the variable data rate to satisfy Condition 3.

The full correlation of the above sequences is $2^{m+1}$ ($>\sqrt{L}$) for the length $L=2^{2m+1}$ (i.e., the length of odd-numbered exponent of 2). Therefore, the sequences do not have the best correlation for the length $L=2^{2m+1}$. Here, L denotes the length of the sequences.

The present invention provides a device and method for generating sequences expressed in quaternary complex numbers so that the correlation becomes $\sqrt{L}$ for the length $L=2^{2m+1}$ and the above conditions are satisfied. In an exemplary embodiment of the present invention, the Kerdock sequences are used to generate quaternary complex quasi-orthogonal codes.

Figure 5:
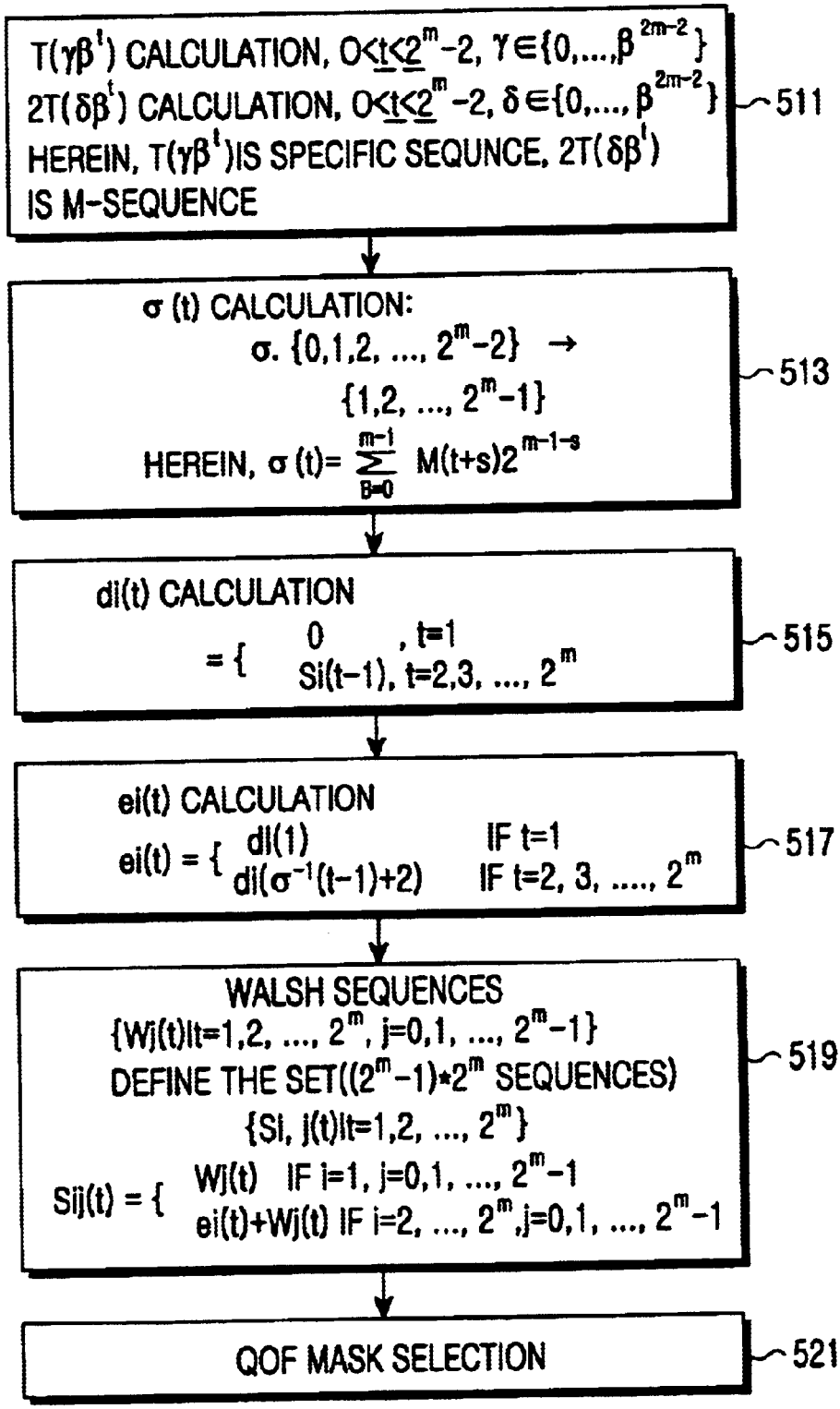
FIG. 5 is a flow diagram illustrating a procedure for generating quaternary complex quasi-orthogonal code masks according to an embodiment of the present invention.

FIG. 5 illustrates a procedure for generating quaternary complex quasi-orthogonal codes for use in a spreading device for a CDMA communication system according to an embodiment of the present invention. Here, a Walsh code can be produced from a M-sequence. That is, a Walsh orthogonal code is generated by column permuting the M-sequence.

Referring to FIG. 5, in step 511, an M-sequence and a specific sequence having a good full correlation property are generated in order to generate a quasi-orthogonal code. In an embodiment of the present invention, Family A, which represents a Kerdock code set generated from Kerdock codes expressed in quaternary numbers, is used to generate complex sequences for the above sequences. At this point, there exists homomorphism, H: n→j$^n$, (j=$\sqrt{-1}$), corresponding to a complex number set for multiplication in a quaternary number set for modulo-4 (hereinafter, referred to as "mod 4" for short) operation. That is, quaternary numbers {0,1,2,3} can be expressed as {1,j,−1,−j} in complex numbers. Therefore, after generation of quaternary sequences, the generated quaternary sequences will undergo conversion in accordance with the homomorphism.

By using a trace function, a binary M-sequence S(t) can be expressed as:

$$S(t) = tr(A\alpha^t) \qquad (5)$$

where $tr(a) = a + a^2 + a^{2^2} + \ldots + a^{2^{m-1}}$, $a \in GF(2^m)$, f(x) is a primitive polynomial of Galois Field $GF(2^m)$, and $\alpha$ is primitive element which is a root of f(x). (See "Introduction to Finite Fields and Their Applications", Rudolf Lidl & Harald Niederreiter)

Functional values of the above binary formula are 0 and 1, and it is possible to generate a quaternary sequence using the trace function in the similar manner.

First, in step 511 of FIG. 5, a binary primitive polynomial f(x) of the m-th degree is selected to obtain a quasi-orthogonal code sequence of length $2^m$. A characteristic polynomial g(x) having quaternary coefficients is generated by applying Hensel Lift to the binary primitive polynomial f(x), as shown in Equation (6). (See "Finite Rings with Identity", B. R. MacDonald)

$$g(x^2) = (-1)^m f(x) f(-x) \bmod 4 \qquad (6)$$

It is possible to construct a Galois ring $GR(4^m)$ using the characteristic polynomial g(x). Further, when β is a root of g(x), β=α mod 2. Given I={0,1,β,β$^2$,...,β$^{2^m-2}$}, an element a of a Galois ring $GR(4^m)$ can be expressed as a=γ+2δ, γ,δ∈I. A trace function, which is a linear function, in the Galois ring is expressed as $$T(a) = \sum_{i=0}^{m-1} \gamma^{2^i} + 2\sum_{i=0}^{m-1} \delta^{2^i}.$$

(See "Sequences with Low Correlation", T. Helleseth and P. V. Kumar)

To obtain a quaternary sequence S(t) of length $N=2^m-1$, the above formula is expressed as the following Equation (7), which is a general formula of the Kerdock code, by using $\beta$ and trace expression.

$$S(t)=T(\gamma\beta^t)+2T(\delta\beta^t), \gamma,\beta\in\{0,1,\beta,\beta^2,\ldots,\beta^{2^m-2}\} \quad (7)$$

where $2T(\delta\beta^t)$ is equal to a value obtained by doubling a binary M-sequence and then applying a mod 4 operation to it. In the embodiment, this sequence portion will be referred to as a quaternary M-sequence. A quaternary M-sequence can be calculated by substituting 0 or $\beta^i(0\leq i\leq 2^{2^m-2})$ for $\delta$, and inserting 0 in a first column. Therefore, in step 511, sequences $S_i(t)=T(\beta^{t+i})$ of length $2^m-1$ where $t=0,1,\ldots,2^m-2$, and quaternary M-sequences $2T(\delta\beta^t)$, which are doubled binary M-sequences, are generated for every i $(0\leq i\leq 2^{2^m-2})$. This is a process of generating Kerdock codes.

Thereafter, in step 513, the column permutation function $\sigma$ that convert the M-sequence into a Walsh code is generated. The column permutation function for the M-sequence is applied to a specific sequence to generate a mask for generating a quasi-orthogonal code. That is, in step 513, when $\alpha=\beta \mod 2$ and $\delta=\beta^r$, $m(t)=tr(a^{(t+r)})$ and a column permutation function $\sigma$ is defined as follows (Definition of column permutation for $T(\gamma\beta^t)$ $\gamma\in\{0,1,\beta,\beta^2,\ldots,\beta^{2^m-2}\}$ of Kerdock code):

$$\sigma: \{0,1,2,\ldots,2^m-2\} \to \{1,2,\ldots,2^m-1\}$$

$$\sigma(t) = \sum_{i=0}^{m-1} m(t+s) 2^{m-1-i}$$

It is possible to generate $(2^m-1)$ quaternary complex sequences of length $2^m$, which simultaneously satisfy Conditions 1 and 2, by inserting "0" at the head of the sequence $T(\gamma\beta^t)$ of length $2^m-1$ in Equation (7) and substituting $\beta^i(0\leq i\leq 2^{2^m-2})$ for $\gamma$. Therefore, when $\gamma=\beta^i$, a sequence for $T(\gamma\beta^t)$ will be expressed as $S_i(t)$ in Equation (8) below. Here, $S_i(t)$ becomes a function of a specific sequence and can be expressed as:

$$K=[S_0(t),S_1(t),\ldots,S_{2^m-2}(t)] \quad (8)$$

where $t=*,0,1,2,\ldots,2^m-2$, and $S_i(*)=0$.

Thereafter, in step 515, a matrix Q shown in FIG. 3 is generated using sequences of the completed set K of Equation (8). The matrix has $(2^m-1)*2^m$ rows and $2^m$ columns. That is, in step 515, by using $(2^m-1)$ sequences $S_i(t)=T(\beta^{t+i})$, $t=0,1,2,\ldots,2^m-2$ generated in step 511, a definition is given ("0" is inserted at the head of the sequence $S_i(t)$):

$$[d_i(t)\,|\,t=1,2,\ldots,2^m, i=1,2,\ldots,2^m-1]$$

$$d_i(t) = \begin{cases} 0, & \text{if } t=1 \\ S_i(t-1), & \text{if } t=2,3,\ldots,2^m \end{cases}$$

Here, it is possible to obtain $(2^m-1)$ sequences of length $2^m$, satisfying Conditions 1 and 2, by applying column permutation to the matrix Q in the same manner as used in column permuting the M-sequence to obtain the Walsh code. Therefore, in step 517, $S_i(t)$ of Equation (7) undergoes column permutation in the same method as used in step 513. That is, in step 517, the sequences generated in step 515 are column permuted according to the column permutation function calculated in step 513. Then, in step 517, new sequences are generated as follows (Column Permutation Process):

$$[e_i(t)\,|\,t=1,2,\ldots,2^m, i=1,2,\ldots,2^m-1]$$

$$e_i(t) = \begin{cases} d_i(t), & \text{if } t=1 \\ d_i(\sigma^{-1}(t-1)+2), & \text{if } t=2,3,\ldots,2^m \end{cases}$$

The sequence $e_i(t)$ generated in step 517 will be referred to as a quasi-orthogonal candidate mask sequence.

Then, in step 519, another quasi-orthogonal candidate mask sequence satisfying Conditions 1 and 2 is generated by modulo 4 addition of the above quasi-orthogonal candidate mask sequence and a Walsh code as shown in FIG. 4. That is, in step 519, quaternary quasi-orthogonal code representatives are generated using the sequences generated in step 517, as follows (Quasi-Orthogonal Code Candidate Generation):

$$[S_{ij}(t)\,|\,t=1,2,\ldots,2^m]$$

$$S_{ij}(t)=e_i(t)+2W_j(t) \pmod 4, i=0,1,2,\ldots,2^m-2, j=0,1,\ldots,2^m-1$$

It is assumed herein that $[W_j(t)\,|\,t=1,2,\ldots,2^m, j=0,1,\ldots,2^m-1]$ means a Walsh sequence which is an orthogonal code, and is represented in symbols of "0" and "1". In the above formula, $e_i(t)$ is $T(\gamma\beta^t)$ of Equation (7), which is column permuted in accordance with the column permutation formula defined in step 513. Therefore, it is possible to obtain $(2^m-1)*2^m$ quasi-orthogonal code candidates by performing step 519.

Thereafter, in step 521, the sequences satisfying Condition 3 are selected from the $(2^m-1)*2^m$ quasi-orthogonal code candidates and then, a used candidate mask for the quasi-orthogonal code is selected as a mask for the quasi-orthogonal code. That is, after the process of step 519, those satisfying Condition 3 are selected from the finally calculated quasi-orthogonal code representatives $S_{ij}(t)$. For selection of the sequences, all partial correlations for every Walsh code and length is calculated to determine whether Condition 3 is satisfied, and the candidate mask is selected as a mask when a partial correlation is satisfied for every Walsh code.

For example, when the length of an orthogonal code is 128, a partial correlation between orthogonal codes and a quasi-orthogonal code candidate is first calculated for every Walsh code having a partial length of 64 and then it is examined whether the partial correlation exceeds 8. If the partial correlation does not exceed 8, the used candidate mask used to generate the quasi-orthogonal code candidate is not selected as a mask. Otherwise, if the condition is satisfied, a partial correlation is calculated again for a partial length 32 with respect to this quasi-orthogonal code candidate. Thereafter, it is determined whether the partial correlation exceeds $4\sqrt{2}$. If the partial correlation does not exceed $4\sqrt{2}$, the candidate mask is not selected as a mask. Otherwise, if the condition is satisfied, the same operation is performed for the next length. After performing the above operation for the partial lengths of up to 4, the candidate masks which have passed the above conditions are selected as quasi-orthogonal code candidate masks satisfying Conditions 1 to 3.

To aid in understanding, a description of an example will now be made regarding the procedure for generating quaternary quasi-orthogonal code candidate sequences with reference to FIG. 5.

Herein, it is assumed that $f(x)=x^3+x+1$ is used for the binary primitive polynomial. When the binary primitive polynomial $f(x)=x^3+x+1$ undergoes Hensel Lift in accordance with Equation (6), a characteristic polynomial having quaternary coefficients becomes $g(x^2)=(-1^3)(x^3+x+1)(-x^3-x+1) \pmod 4$. This can be rewritten as $g(x)=x^3+2x^2+x+3$.

Accordingly, in step 511, let the root of $g(x)$ be $\beta$ to determine specific sequences. That is, $\beta^3+2\beta^2+\beta+3=0$. For convenience, $\beta$, $\beta^2$, $\beta^3$, $\beta^4$, $\beta^5$, $\beta^6$ and $\beta^7$ will be first determined, as follows.

$\beta=\beta$ $\beta^2=\beta^2$ $\beta^3=2\beta^2+3\beta+1$ $\beta^4=2\beta^3+3\beta^2+\beta=2(2\beta^2+3\beta+1)+3\beta^2+\beta=3\beta^2+3\beta+2$ $\beta^5=3\beta^3+3\beta^2+2\beta=3(2\beta^2+3\beta+1)+3\beta^2+2\beta=\beta^2+3\beta+3$ $\beta^6=\beta^3+3\beta^2+3\beta=(2\beta^2+3\beta+1)+3\beta^2+3\beta=\beta^2+2\beta+1$ $\beta^7=\beta^3+2\beta^2+\beta=(2\beta^2+3\beta+1)+2\beta^2+\beta=1$ When $\gamma=\beta^0=1$, $T(\gamma\beta^t)=T(\beta^t)$ will be determined as follows.

$$\text{for } t = 0, T(1) = \sum_{i=0}^{2} \beta^{2^i} = 1+1+1 = 3$$

$$\text{for } t = 1, T(\beta) = \sum_{i=0}^{2} \beta^{2^i} = \beta + \beta^2 + \beta^4 = 2$$

$$\text{for } t = 2, T(\beta^2) = \sum_{i=0}^{2} \beta^{2^i} = \beta^2 + \beta^4 + \beta^8 = \beta^2 + \beta^4 + \beta = 2$$

$$\text{for } t = 3, T(\beta^3) = \sum_{i=0}^{2} \beta^{2^i} = \beta^3 + \beta^6 + \beta^{12} = \beta^3 + \beta^6 + \beta^5 = 1$$

$$\text{for } t = 4, T(\beta^4) = \sum_{i=0}^{2} \beta^{2^i} = \beta^4 + \beta^8 + \beta^{16} = \beta^4 + \beta + \beta^2 = 2$$

$$\text{for } t = 5, T(\beta^5) = \sum_{i=0}^{2} \beta^{2^i} = \beta^5 + \beta^{10} + \beta^{20} = \beta^5 + \beta^3 + \beta^6 = 1$$

$$\text{for } t = 6, T(\beta^6) = \sum_{i=0}^{2} \beta^{2^i} = \beta^6 + \beta^{12} + \beta^{24} = \beta^6 + \beta^5 + \beta^3 = 1$$

In addition, when $\gamma=\beta^1=\beta$, $T(\gamma\beta^t)=T(\beta^t)$ will be determined as follows. Then, $T(\beta)=T(1)$ for $t=0$, $T(\beta^2)=T(1)$ for $t=1$, $T(\beta^3)=T(1)$ for $t=2$, $T(\beta^4)=T(1)$ for $t=3$, $T(\beta^5)=T(1)$ for $t=4$, $T(\beta^6)=T(1)$ for $t=5$ and $T(\beta^7)=T(1)$ for $t=6$, which is equivalent to shifting once the sequences determined when $\gamma=\beta^0=1$.

In this manner, a quaternary sequence 3221211 and its shifted sequence can be determined. A sequence shifted i times will be referred to as $S_i$. In addition, it is possible to determine 1001011 as an associated M-sequence.

In step 513, it is possible to calculate a column permutation function for converting an M-sequence to a Walsh code in accordance with a formula $$\sigma(t) = \sum_{s=0}^{m-1} m(t+s)2^{m-1-s}$$

using the M-sequence 1001011. Here, the formula $\sigma(t)$ is equivalent to grouping the M-sequence by three (3) consecutive terms and converting them to decimal numbers. That is, the first three terms are 100, which can converted to decimal number 4; the second three terms are 001, which can be converted to decimal number 1; the third three terms are 010, which can be converted to decimal number 2; the fourth three terms are 101, which can be converted to decimal number 5; the fifth three terms are 011, which can be converted to decimal number 3; the sixth three terms are 111, which can be converted to decimal number 7; and the seventh three terms are 110, which can be converted to decimal number 6. The following results can be obtained using the formula $$\sigma(t) = \sum_{s=0}^{m-1} m(t+s)2^{m-1-s}.$$

For $t = 0$, $$\sigma(0) = \sum_{s=0}^{2} m(t+s)2^{2-s} = 4 \times m(0) + 2 \times m(1) + m(2) = (100)_2 = 4$$

For $t = 1$, $$\sigma(1) = \sum_{s=0}^{2} m(t+s)2^{2-s} = 4 \times m(1) + 2 \times m(2) + m(3) = (001)_2 = 1$$

For $t = 2$, $$\sigma(2) = \sum_{s=0}^{2} m(t+s)2^{2-s} = 4 \times m(2) + 2 \times m(3) + m(4) = (010)_2 = 2$$

For $t = 3$, $$\sigma(3) = \sum_{s=0}^{2} m(t+s)2^{2-s} = 4 \times m(3) + 2 \times m(4) + m(5) = (101)_2 = 5$$

For $t = 4$, $$\sigma(4) = \sum_{s=0}^{2} m(t+s)2^{2-s} = 4 \times m(4) + 2 \times m(5) + m(6) = (011)_2 = 3$$

For $t = 5$, $$\sigma(5) = \sum_{s=0}^{2} m(t+s)2^{2-s} = 4 \times m(5) + 2 \times m(6) + m(7) = (111)_2 = 7$$

For $t = 6$, $\sigma(6) = \sum_{s=0}^{2} m(t+s)2^{2-s} = 4 \times m(6) + 2 \times m(7) + m(8) = (110)_2 = 6$ The calculated column permutation functions are shown in Table 3A.

TABLE 3A

| T | Three Consecutive Terms | $\sigma(t)$ |
|---|---|---|
| 0 | 100 | 4 |
| 1 | 001 | 1 |
| 2 | 010 | 2 |
| 3 | 101 | 5 |
| 4 | 011 | 3 |
| 5 | 111 | 7 |
| 6 | 110 | 6 |

In step 515, "0" is added at the head of every quaternary sequence determined in step 511. With regard to the expression of $d_i(t)$ in accordance with $S_i(t)$, when $i=0$, $d_0(t)$ is the quaternary sequence $S_0(t)$, at the head of which "0" is added, determined in step 511 for $\gamma=\beta^0=1$. That is, when $S_0(0)=3$, $S_0(1)=2$, $S_0(2)=2$, $S_0(3)=1$, $S_0(4)=2$, $S_0(5)=1$ and $S_0(6)=1$ as determined in step 511, $d_0(t)$ is determined such that $d_0(0)$ representing the foremost bit is always "0" and $d_0(1)$ to $d_0(7)$ are as shown in Table 3B.

TABLE 3B $d_0(1) = S_0(1\text{-}1) = S_0(0) = 3$
$d_0(2) = S_0(2\text{-}1) = S_0(1) = 2$
$d_0(3) = S_0(3\text{-}1) = S_0(2) = 2$
$d_0(4) = S_0(4\text{-}1) = S_0(3) = 1$
$d_0(5) = S_0(5\text{-}1) = S_0(4) = 2$
$d_0(6) = S_0(6\text{-}1) = S_0(5) = 1$
$d_0(7) = S_0(7\text{-}1) = S_0(6) = 1$ In addition, when i=1, $d_1(t)$ is the quaternary sequence $S_1(t)$, at the head of which "0" is added, determined in step 511 for $\gamma=\beta^1=\beta$. That is, when $S_1(0)=2$, $S_1(1)=2$, $S_1(2)=1$, $S_1(3)=2$, $S_1(4)=1$, $S_1(5)=1$ and $S_1(6)=3$ as determined in step 511, $d_1(t)$ is determined such that $d_1(0)$ representing the foremost bit is always "0" and $d_1(1)$ to $d_1(7)$ are as shown in Table 3C.

TABLE 3C $d_1(1) = S_1(1\text{-}1) = S_1(0) = 2$
$d_1(2) = S_1(2\text{-}1) = S_1(1) = 2$
$d_1(3) = S_1(3\text{-}1) = S_1(2) = 1$
$d_1(4) = S_1(4\text{-}1) = S_1(3) = 2$
$d_1(5) = S_1(5\text{-}1) = S_1(4) = 1$
$d_1(6) = S_1(6\text{-}1) = S_1(5) = 1$
$d_1(7) = S_1(7\text{-}1) = S_1(6) = 3$ In step 517, the column shifted quaternary sequences are column permutated with the above column permutation functions. First, the column shifted quaternary sequences are shown in Table 3D.

TABLE 3D

| $c_1$ | $c_2$ | $c_3$ | $c_4$ | $c_5$ | $c_6$ | $c_7$ |
|---|---|---|---|---|---|---|
| 3 | 2 | 2 | 1 | 2 | 1 | 1 |
| 1 | 3 | 2 | 2 | 1 | 2 | 1 |
| 1 | 1 | 3 | 2 | 2 | 1 | 2 |
| 2 | 1 | 1 | 3 | 2 | 2 | 1 |
| 1 | 2 | 1 | 1 | 3 | 2 | 2 |
| 2 | 1 | 2 | 1 | 1 | 3 | 2 |
| 2 | 2 | 1 | 2 | 1 | 1 | 3 |

In Table 3D, $c_i$ denotes an i-th column. For example, $c_1$ denotes a first column and $c_2$ a second column. If column permuted with the column permutation functions determined in step 513, the quaternary sequences of Table 3D become as follows.

TABLE 3E

| $c_4$ | $c_1$ | $c_2$ | $c_5$ | $c_3$ | $c_7$ | $c_6$ |
|---|---|---|---|---|---|---|
| 1 | 3 | 2 | 2 | 2 | 1 | 1 |
| 2 | 1 | 3 | 1 | 2 | 1 | 2 |
| 2 | 1 | 1 | 2 | 3 | 2 | 1 |
| 3 | 2 | 1 | 2 | 1 | 1 | 2 |
| 1 | 1 | 2 | 3 | 1 | 2 | 2 |
| 1 | 2 | 1 | 1 | 2 | 2 | 3 |
| 2 | 2 | 2 | 1 | 1 | 3 | 1 |

Therefore, sequences of length 8 shown in Table 3F are generated by adding "0" at the head of every sequence determined by column permuting the column shifted quaternary sequences with the column permutation functions. The generated become quasi-orthogonal code mask candidates of length 8.

TABLE 3F

| 0 | 1 | 3 | 2 | 2 | 2 | 1 | 1 |
|---|---|---|---|---|---|---|---|
| 0 | 2 | 1 | 3 | 1 | 2 | 1 | 2 |
| 0 | 2 | 1 | 1 | 2 | 3 | 2 | 1 |
| 0 | 3 | 2 | 1 | 2 | 1 | 1 | 2 |
| 0 | 1 | 1 | 2 | 3 | 1 | 2 | 2 |
| 0 | 1 | 2 | 1 | 1 | 2 | 2 | 3 |
| 0 | 2 | 2 | 2 | 1 | 1 | 3 | 1 |

The quaternary quasi-orthogonal code sequences generated in the process of FIG. 5 are determined by the mask function $e_f(t)$. That is, when the quasi-orthogonal codes generated from mask function $e_f(t)$ satisfy Conditions 1 to 3, it is possible to obtain $(2^m-1)$ quaternary complex orthogonal codes. Therefore, if there exist k masks satisfying Conditions 1 to 3, it is possible to obtain $k \times 2^m$ quaternary complex quasi-orthogonal codes. Table 4 shows the number of the quaternary complex quasi-orthogonal codes according to the M-sequences. Table 5 shows the mask function $e_f(t)$ for the quaternary complex quasi-orthogonal codes determined for m=6. Tables 6 to 8 show the mask function $e_f(t)$ for the quaternary complex quasi-orthogonal codes determined for m=7, m=8 and m=9, respectively. Here, 0 denotes 1, 1 denotes j, 2 denotes -1 and 3 denotes -j.

TABLE 4

| M | characteristic polynomial | # of Quasi-orthogonal sequences |
|---|---|---|
| 6 | 1002031 | 4*64 |
| 7 | 10020013 | 4*128 |
| 8 | 102231321 | 4*256 |

TABLE 5

$f(X) = 1 + X + X^6$, $g(X) = 1 + 3X + 2X^3 + X^6$

| | | | | | | | | |
|---|---|---|---|---|---|---|---|---|
| e1 | 00131120 | 22131102 | 20113122 | 20331322 | 11200013 | 33200031 | 31222011 | 31000211 |
| e2 | 03010121 | 21230121 | 10301210 | 10303032 | 23210323 | 23212101 | 30101012 | 12321012 |
| e3 | 00021311 | 31112202 | 33132000 | 02001113 | 02223313 | 11132022 | 13112220 | 00203111 |
| e4 | 01032101 | 12103212 | 30323212 | 23212101 | 01210301 | 30103230 | 30101012 | 01212123 |

TABLE 6

$f(X) = 1 + X + X^7$, $g(X) = 3 + X + 2X^4 + X^7$

| | | | | | | | | |
|---|---|---|---|---|---|---|---|---|
| e1 | 03233010 | 01031012 | 32302321 | 30100323 | 12320323 | 32300103 | 23211012 | 03231232 |
| | 30100323 | 10120103 | 01031012 | 21011232 | 03231232 | 01033230 | 32300103 | 30102101 |
| e2 | 01033230 | 10300121 | 12102123 | 21013010 | 12320323 | 03013032 | 01211030 | 32300103 |
| | 03011210 | 30100323 | 32302321 | 23031030 | 10302303 | 23213230 | 21011232 | 30322123 |
| e3 | 02003331 | 22021333 | 13110002 | 33132000 | 31332220 | 33132000 | 20221113 | 22021333 |
| | 02001113 | 00201333 | 31330002 | 33130222 | 31330002 | 11312000 | 02001113 | 22023111 |
| e4 | 02221113 | 02001131 | 33130200 | 11132000 | 00203133 | 22201333 | 13330002 | 13110020 |
| | 11130222 | 33132022 | 02003313 | 02223331 | 31330020 | 31110002 | 00021333 | 22023133 |

TABLE 7

$f(X) = 1 + X^2 + X^3 + X^4 + X^8$
$g(X) = 1 + 2X + 3X^2 + X^3 + 3X^4 + 2X^5 + 2X^6 + X^8$

| | | | | | | | | |
|---|---|---|---|---|---|---|---|---|
| e1 | 03101021 | 23121201 | 21321021 | 23123023 | 03323221 | 23303001 | 21103221 | 23301223 |
| | 23123023 | 03103203 | 01303023 | 03101021 | 23301223 | 03321003 | 01121223 | 03323221 |
| | 30232312 | 32030310 | 12012312 | 32032132 | 30010112 | 32212110 | 12230112 | 32210332 |
| | 10210310 | 12012312 | 32030310 | 12010130 | 10032110 | 12230112 | 32212110 | 12232330 |
| e2 | 00023313 | 20221333 | 11132202 | 31330222 | 33132220 | 31112022 | 00201113 | 02221311 |
| | 20223111 | 00021131 | 13110222 | 33312202 | 31110200 | 33130002 | 20001311 | 22021113 |
| | 11132202 | 31330222 | 00023313 | 20221333 | 00201113 | 02221311 | 33132220 | 31112022 |
| | 31332000 | 11130020 | 02001333 | 22203313 | 02223133 | 00203331 | 13332022 | 11312220 |
| e3 | 02001311 | 31330200 | 02223111 | 31112000 | 22023313 | 11312202 | 22201113 | 11130002 |
| | 22011131 | 33132202 | 22203331 | 33310002 | 20221311 | 31332022 | 20003111 | 31110222 |
| | 11132220 | 22203331 | 33132202 | 00203313 | 31110222 | 02221333 | 13110200 | 20221311 |
| | 13330222 | 02223111 | 31330200 | 20223133 | 11130002 | 00023331 | 33130020 | 22023313 |
| e4 | 02011210 | 12322101 | 21231210 | 12320323 | 32122303 | 01033230 | 32120121 | 23213230 |
| | 23033212 | 10122321 | 23031030 | 32302321 | 12100301 | 03233010 | 30320301 | 03231232 |
| | 12322101 | 21233032 | 30102101 | 21231210 | 01033230 | 10300121 | 01031012 | 32120121 |
| | 32300103 | 23033212 | 32302321 | 01213212 | 21011232 | 12100301 | 03231232 | 12102123 |

TABLE 8

$f(X) = 1 + X^4 + X^9$, $g(X) = 3 + 2X^2 + 3X^4 + X^9$

| | | | | | | | | |
|---|---|---|---|---|---|---|---|---|
| e1 | 03232123 | 01212321 | 01032303 | 21230323 | 30103032 | 10301012 | 32303212 | 30323010 |
| | 21232101 | 01030121 | 01210103 | 03230301 | 30321232 | 32301030 | 10303230 | 30101210 |
| | 30323010 | 10121030 | 10301012 | 12321210 | 21230323 | 23210121 | 01212321 | 21010301 |
| | 30101210 | 32121012 | 32301030 | 12103010 | 03230301 | 23032321 | 01030121 | 03010323 |
| | 30323010 | 32303212 | 32123230 | 12321210 | 03012101 | 23210121 | 01212321 | 03232123 |
| | 30101210 | 10303230 | 10123212 | 12103010 | 21012123 | 23032321 | 01030121 | 21232101 |
| | 21010301 | 01212321 | 01032303 | 03012101 | 30103032 | 32123230 | 10121030 | 30323010 |
| | 03010323 | 01030121 | 01210103 | 21012123 | 30321232 | 10123212 | 32121012 | 30101210 |
| e2 | 02221333 | 02003133 | 33130020 | 11130002 | 31112000 | 31330200 | 22021131 | 00021113 |
| | 20223133 | 20001333 | 33310002 | 11310020 | 31332022 | 31110222 | 00023331 | 22023313 |
| | 00203313 | 22201113 | 13332000 | 13110200 | 33132202 | 11132220 | 02223111 | 02001311 |
| | 00021113 | 22021131 | 31330200 | 31112000 | 11130002 | 33130020 | 02003133 | 02221333 |
| | 31112000 | 31330200 | 22021131 | 00021113 | 02221333 | 02003133 | 33130020 | 11130002 |
| | 13110200 | 13332000 | 22201113 | 00201131 | 02001311 | 02223111 | 11132220 | 33132202 |
| | 33132202 | 11132220 | 02223111 | 02001311 | 00201131 | 22201113 | 13332000 | 13110200 |
| | 33312220 | 11312202 | 20221311 | 20003111 | 22203331 | 22023313 | 13112022 | 13330222 |
| e3 | 01212321 | 03232123 | 32301030 | 30321232 | 32121012 | 30101210 | 23210121 | 21230323 |
| | 30101210 | 10303230 | 03012101 | 23210121 | 21010301 | 01212321 | 30321232 | 10123212 |
| | 30103032 | 10301012 | 21232101 | 01030121 | 03230301 | 23032321 | 30323010 | 10121030 |
| | 01210103 | 03230301 | 10121030 | 12101232 | 10301012 | 12321210 | 23212303 | 21232101 |
| | 23212303 | 21232101 | 32123230 | 30103032 | 32303212 | 30323010 | 01210103 | 03230301 |
| | 30323010 | 10121030 | 21012123 | 01210103 | 03010323 | 23212303 | 30103032 | 10301012 |
| | 12103010 | 32301030 | 21010301 | 01212321 | 03012101 | 23210121 | 12323032 | 32121012 |
| | 01032303 | 03012101 | 32121012 | 30101210 | 32301030 | 30321232 | 23030103 | 21010301 |
| e4 | 00203331 | 02003111 | 13110222 | 11310002 | 31112022 | 33312202 | 22201131 | 20001311 |
| | 33132220 | 31332000 | 20221333 | 22021113 | 20001311 | 22201131 | 33312202 | 31112022 |
| | 11310002 | 31332000 | 20221333 | 00203331 | 20001311 | 00023313 | 11130020 | 31112022 |
| | 22021113 | 02003111 | 13110222 | 33132220 | 31112022 | 11130020 | 00023313 | 20001311 |
| | 22023331 | 20223111 | 13112000 | 11312220 | 31110200 | 33310020 | 00021131 | 02221311 |
| | 33130002 | 31330222 | 02001333 | 00201113 | 02221311 | 00021131 | 33310020 | 31110200 |
| | 33130002 | 13112000 | 20223111 | 00201113 | 20003133 | 00021131 | 33310020 | 13332022 |
| | 22023331 | 02001333 | 31330222 | 11312220 | 13332022 | 33310020 | 00021131 | 20003133 |

As described above, when the system runs short of orthogonal codes, it is possible to increase the channel capacity by using the quasi-orthogonal codes generated according to the present invention. In this case, there occurs minimum interference with the Walsh orthogonal codes, providing a fixed correlation value. For example, for N=64, the correlation value between a quasi-orthogonal code and a Walsh orthogonal code is either 8 or −8. In addition, for N=256, a partial correlation value is also either 8 or −8 (during the length N=64). This means that it is possible to accurately predict the interference, providing excellent characteristics.

Therefore, as can be appreciated from the foregoing process, to obtain a complex quasi-orthogonal code of length $2^m$, a characteristic polynomial f(X) of the m-th degree is initially selected. Thus, to obtain a complex quasi-orthogonal code of length $128=2^7$, a characteristic polynomial of the $7^{th}$ degree is first selected. At this point, to obtain a sequence of length 128, the characteristic polynomial should be a primitive polynomial (c.f. "Shift Register Sequence", Solomon W. Golomb), and there are 18 primitive polynomials of the $7^{th}$ degree in total. Tables 9 to 26 show mask functions for every complex quasi-orthogonal sequences of length 128 satisfying Conditions 1 to 3 for the 18 primitive polynomials of the $7^{th}$ degree, respectively. Further, in the Tables 9 to 26, the results for Condition 4 are shown together. Here, "e1+e2" refers to the partial correlation between a first mask and a second mask, and the numerals on the right side of it represent the lengths of the portions where the first and second masks satisfy Condition 4. For example, in Table 9, "e1+e2: 64, 128" means that a partial correlation between quasi-orthogonal codes generated respectively with e1 and e2 masks satisfies Condition 4 only for the partial lengths 64 and 128. Similarly, "e1+e3: 32, 64, 128" means that a partial correlation between quasi-orthogonal codes generated respectively with e1 and e3 masks satisfies Condition 4 only for the partial lengths 32, 64 and 128. Therefore, it can be understood that the partial correlation property becomes better, as the numerals and the kinds of the partial lengths satisfying the partial correlation condition increase more in number. Further, it can be noted from following tables that the partial correlation between the quasi-orthogonal sequences depends on the characteristic polynomials. Therefore, it is preferable to use the characteristic polynomials which generate the quasi-orthogonal codes having a good partial correlation between the quasi-orthogonal sequences.

TABLE 9

$f(X) = 1 + X + X^7, g(X) = 3 + X + 2X^4 + X^7$

| e1 | 03233010 | 01031012 | 32302321 | 30100323 | 12320323 | 32300103 | 23211012 | 03231232 |
|---|---|---|---|---|---|---|---|---|
|    | 30100323 | 10120103 | 01031012 | 21011232 | 03231232 | 01033230 | 32300103 | 30102101 |
| e2 | 01033230 | 10300121 | 12102123 | 21013010 | 12320323 | 03013032 | 01211030 | 32300103 |
|    | 03011210 | 30100323 | 32302321 | 23031030 | 10302303 | 23213230 | 21011232 | 30322123 |
| e3 | 02003331 | 22021333 | 13110002 | 33132000 | 31332220 | 33132000 | 20221113 | 22021333 |
|    | 02001113 | 00201333 | 31330002 | 33130222 | 31330002 | 11312000 | 02001113 | 22023111 |
| e4 | 02221113 | 02001131 | 33130200 | 11132000 | 00203133 | 22201333 | 13330002 | 13110020 |
|    | 11130222 | 33132022 | 02003313 | 02223331 | 31330020 | 31110002 | 00021333 | 22023133 | e1 + e2 : 64, 128
e1 + e3 : 32, 64, 128
e1 + e4 : 8, 16, 64, 128
e2 + e3 : 64, 128
e2 + e4 : 8, 64, 128
e3 + e4 : 16, 64, 128

TABLE 10

$f(X) = 1 + X^3 + X^7, g(X) = 3 + X^3 + 2X^5 + X^7$

| e1 | 00201113 | 13330200 | 22203313 | 31332000 | 31110200 | 00203331 | 13112000 | 22201131 |
|---|---|---|---|---|---|---|---|---|
|    | 33132220 | 02221311 | 33312202 | 02001333 | 20001311 | 33130002 | 20221333 | 33310020 |
| e2 | 03320130 | 12011003 | 21102312 | 12011003 | 10033023 | 23120332 | 10033023 | 01302110 |
|    | 21322330 | 12231021 | 21322330 | 30013203 | 32031223 | 23300310 | 10213001 | 23300310 |
| e3 | 03231030 | 01213010 | 21231012 | 01031210 | 30322321 | 32300301 | 30100121 | 10300323 |
|    | 12100103 | 32300301 | 12322303 | 10300323 | 03231030 | 23031232 | 21231012 | 23213032 |
| e4 | 00312033 | 02110031 | 20332213 | 00312033 | 31001102 | 33203100 | 11021322 | 31001102 |
|    | 31223302 | 33021300 | 33021300 | 13001120 | 00130233 | 02332231 | 02332231 | 22312011 | e1 + e2 : 32, 64, 128
e1 + e3 : 8, 16, 32, 128
e1 + e4 : 8, 32, 128
e2 + e3 : 4, 16, 64, 128
e2 + e4 : 4, 8, 128
e3 + e4 : 4, 8, 32, 64, 128

TABLE 11

$f(X) = 1 + X + X^2 + X^3 + X^7, g(X) = 3 + 3X + X^2 + X^3 + 2X^4 + 2X^5 + X^7$

| e1 | 00201333 | 13110002 | 11312000 | 20221113 | 11312000 | 02003331 | 00201333 | 31332220 |
|---|---|---|---|---|---|---|---|---|
|    | 00203111 | 31330002 | 33132000 | 20223331 | 11310222 | 20223331 | 22021333 | 31330002 |
| e2 | 02333100 | 33202231 | 00133320 | 31002011 | 31000233 | 22313320 | 11022231 | 02331322 |
|    | 22311102 | 31002011 | 02333100 | 11020013 | 33200013 | 02331322 | 31000233 | 00131102 |
| e3 | 03323221 | 23303001 | 10032110 | 30012330 | 32032132 | 30230130 | 21323203 | 23121201 |
|    | 01301201 | 03103203 | 30232312 | 32030310 | 30010112 | 10030332 | 01123001 | 21103221 |
| e4 | 01301201 | 10212132 | 23303001 | 10032110 | 10030332 | 23301223 | 10210310 | 01303023 |

TABLE 11-continued $f(X) = 1 + X + X^2 + X^3 + X^7, g(X) = 3 + 3X + X^2 + X^3 + 2X^4 + 2X^5 + X^7$

| | | | | | | | |
|---|---|---|---|---|---|---|---|
| 32212110 | 23301223 | 32032132 | 01303023 | 01301201 | 32030310 | 23303001 | 32210332 | e1 + e2 : 8, 16, 64, 128
e1 + e3 : 8, 16, 64, 128
e1 + e4 : 8, 128
e2 + e3 : 4, 8, 64, 128
e2 + e4 : 4, 8, 32, 64, 128
e3 + e4 : 64, 128

TABLE 12

$f(X) = 1 + X^4 + X^7, g(X) = 3 + 2X^2 + 3X^4 + X^7$

| | | | | | | | |
|---|---|---|---|---|---|---|---|
| e1 | 02330013 | 33201322 | 13001120 | 00312033 | 31223302 | 00312033 | 20112231 | 33201322 |
| | 20110013 | 33203100 | 10003302 | 22132033 | 13003302 | 00310211 | 20110013 | 11021322 |
| e2 | 01301021 | 10212312 | 01301021 | 32030130 | 30232132 | 03103023 | 12010310 | 03103023 |
| | 23303221 | 10032330 | 01121003 | 10032330 | 12230332 | 03323001 | 12230332 | 21101223 |
| e3 | 03321223 | 23301003 | 03103023 | 01301021 | 23301003 | 03321223 | 23123203 | 21321201 |
| | 12232110 | 10030112 | 12010310 | 32030130 | 32212330 | 30010332 | 32030130 | 12010310 |
| e4 | 00203331 | 13112000 | 02221311 | 11130020 | 00023313 | 31110200 | 02001333 | 33132220 |
| | 20003133 | 33312202 | 22021113 | 31330222 | 02001333 | 33132220 | 00023313 | 31110200 | e1 + e2 : 4, 8, 32, 64, 128
e1 + e3 : 4, 8, 64, 128
e1 + e4 : 8, 16, 64, 128
e2 + e3 : 64, 128
e2 + e4 : 8, 128
e3 + e4 : 8, 16, 64, 128

TABLE 13

$f(X) = 1 + X^2 + X^3 + X^4 + X^7$
$g(X) = 3 + 2X^1 + X^2 + 3X^3 + 3X^4 + 2X^5 + X^7$

| | | | | | | | |
|---|---|---|---|---|---|---|---|
| e1 | 03233010 | 30322123 | 21013010 | 30320301 | 03011210 | 30100323 | 21231210 | 30102101 |
| | 01033230 | 32122303 | 23213230 | 32120121 | 01211030 | 32300103 | 23031030 | 32302321 |
| e2 | 03101021 | 30230130 | 10032110 | 01121223 | 30010112 | 03321003 | 23123023 | 32030310 |
| | 32210332 | 23303001 | 21323203 | 12012312 | 23123023 | 32030310 | 30010112 | 03321003 |
| e3 | 00312033 | 02332231 | 11023100 | 13003302 | 11023100 | 31221120 | 00312033 | 20110013 |
| | 22132033 | 02330013 | 11021322 | 31223302 | 33203100 | 31223302 | 00310211 | 02130013 |
| e4 | 02003133 | 02001311 | 13110200 | 13112022 | 02003133 | 20223133 | 13110200 | 31330200 |
| | 20223133 | 20221311 | 31330200 | 31332022 | 20223133 | 02003133 | 31330200 | 13110200 | e1 + e2 : 4, 8, 32, 128
e1 + e3 : 4, 16, 32, 64, 128
e1 + e4 : 16, 128
e2 + e3 : 4, 64, 128
e2 + e4 : 32, 128
e3 + e4 : 8, 128

TABLE 14

$f(X) = 1 + X^1 + X^2 + X^5 + X^7$
$g(X) = 3 + 3X^1 + 3X^2 + 2X^3 + 2X^4 + X^5 + 2X^6 + X^7$

| | | | | | | | |
|---|---|---|---|---|---|---|---|
| e1 | 00023111 | 00021333 | 11310200 | 11312022 | 31110002 | 13330002 | 20223313 | 02003313 |
| | 11132000 | 33312000 | 22023133 | 00203133 | 02223331 | 02221113 | 31332202 | 31330020 |
| e2 | 03012101 | 12101232 | 30323010 | 03012101 | 10303230 | 23032321 | 01210103 | 10303230 |
| | 23210121 | 32303212 | 32303212 | 01032303 | 30101210 | 03230301 | 03230301 | 12323032 |
| e3 | 03323221 | 32030310 | 30010112 | 01303023 | 30230130 | 01123001 | 21321021 | 10032110 |
| | 30230130 | 23301223 | 21321021 | 32210332 | 21101003 | 32030310 | 12232330 | 01303023 |
| e4 | 02003313 | 31332202 | 31330020 | 02001131 | 02003313 | 13110020 | 13112202 | 02001131 |
| | 20223313 | 31330020 | 13110020 | 02003313 | 20223313 | 13112202 | 31332202 | 02003313 | e1 + e2 : 32, 64, 128
e1 + e3 : 16, 64, 128
e1 + e4 : 64, 128
e2 + e3 : 4, 8, 128
e2 + e4 : 64, 128
e3 + e4 : 16, 64, 128

TABLE 15

$f(X) = 1 + X + X^3 + X^5 + X^7$
$g(X) = 3 + X + 2X^2 + 3X^3 + 3X^5 + 2X^6 + X^7$

| | | | | | | | | |
|---|---|---|---|---|---|---|---|---|
| e1 | 00021333 | 33310222 | 33312000 | 00023111 | 00021333 | 11132000 | 11130222 | 00023111 |
| | 22201333 | 33312000 | 11132000 | 00021333 | 22201333 | 11130222 | 33310222 | 00021333 |
| e2 | 01122132 | 23302132 | 23120332 | 01300332 | 01120310 | 23300310 | 01300332 | 23120332 |
| | 01302110 | 01300332 | 23300310 | 23302132 | 01300332 | 01302110 | 01120310 | 01122132 |
| e3 | 01212123 | 32301232 | 12323230 | 03012303 | 03010121 | 30103230 | 32303010 | 23032123 |
| | 12101030 | 21012321 | 01030323 | 10301210 | 10303032 | 23210323 | 21010103 | 30321030 |
| e4 | 00201311 | 22021311 | 00021333 | 00023111 | 31330020 | 13110020 | 13332220 | 13330002 |
| | 33132022 | 33130200 | 33312000 | 11132000 | 20221131 | 20223313 | 02223331 | 20003331 | e1 + e2 : 8, 16, 64, 128
e1 + e3 : 16, 32, 64, 128
e1 + e4 : 64, 128
e2 + e3 : 4, 64, 128
e2 + e4 : 8, 32, 128
e3 + e4 : 16, 64, 128

TABLE 16

$f(X) = 1 + X^3 + X^4 + X^5 + X^7$
$g(X) = 3 + 2X^2 + X^3 + X^4 + 3X^5 + 2X^6 + X^7$

| | | | | | | | | |
|---|---|---|---|---|---|---|---|---|
| e1 | 03321223 | 32030130 | 10032330 | 03101201 | 12010310 | 23301003 | 23121021 | 30012110 |
| | 32030130 | 03321223 | 03101201 | 10032330 | 01123221 | 30232132 | 12230332 | 01303203 |
| e2 | 03011012 | 12102321 | 30100121 | 03231030 | 03233212 | 30102303 | 12101103 | 03013230 |
| | 23031232 | 10300323 | 10120301 | 01033032 | 23213032 | 32300301 | 32120323 | 01211232 |
| e3 | 02003133 | 31332022 | 20003111 | 13332000 | 11130002 | 00023331 | 11312202 | 00201131 |
| | 31330200 | 20223133 | 13330222 | 02223111 | 00021113 | 33310002 | 00203313 | 33132202 |
| e4 | 00021113 | 00023331 | 11132220 | 11130002 | 33130020 | 11310020 | 22023313 | 00203313 |
| | 02003133 | 20223133 | 31332022 | 13112022 | 13330222 | 13332000 | 20001333 | 20003111 | e1 + e2 : 4, 8, 16, 128
e1 + e3 : 16, 64, 128
e1 + e4 : 16, 64, 128
e2 + e3 : 64, 128
e2 + e4 : 32, 64, 128
e3 + e4 : 64, 128

TABLE 17

$f(X) = 1 + X + X^2 + X^3 + X^4 + X^5 + X^7$
$g(X) = 3 + 3X + 3X^2 + X^3 + X^4 + 3X^5 + 2X^6 + X^7$

| | | | | | | | | |
|---|---|---|---|---|---|---|---|---|
| e1 | 03013230 | 12100103 | 32302123 | 01033032 | 23031232 | 32122101 | 30102303 | 03233212 |
| | 10302101 | 23033010 | 21013212 | 30100121 | 30320103 | 03011012 | 23213032 | 32300301 |
| e2 | 02223313 | 00023133 | 13330020 | 11130200 | 20223331 | 22023111 | 31330002 | 33130222 |
| | 00023133 | 02223313 | 11130200 | 13330020 | 00201333 | 02001113 | 11312000 | 13112220 |
| e3 | 01033032 | 03011012 | 23033010 | 03233212 | 30320103 | 10120301 | 12320121 | 10302101 |
| | 01211232 | 03233212 | 01033032 | 21233230 | 30102303 | 10302191 | 30320103 | 32302123 |
| e4 | 00311102 | 00313320 | 22133320 | 00313320 | 11200013 | 11202231 | 11200013 | 33020013 |
| | 20333100 | 02113100 | 20333100 | 20331322 | 13000233 | 31220233 | 31222011 | 31220233 | e1 + e2  16, 64, 128
e1 + e3  64, 128
e1 + e4  4, 16, 32, 64, 128
e2 + e3  16, 32, 128
e2 + e4  8, 16, 64, 128
e3 + e4  4, 8, 32, 128

TABLE 18

$f(X) = 1 + X^6 + X^7$,
$g(X) = 3 + 2X^3 + 3X^6 + X^7$

| | | | | | | | | |
|---|---|---|---|---|---|---|---|---|
| e1 | 01032303 | 03012101 | 30321232 | 32301030 | 12103010 | 32301030 | 23210121 | 03012101 |
| | 32123230 | 30103032 | 03230301 | 01210103 | 03230301 | 23032321 | 32123230 | 12321210 |
| e2 | 00312011 | 00310233 | 00132033 | 22312033 | 20112213 | 20110031 | 02110013 | 20330013 |
| | 33203122 | 11023122 | 33023100 | 33021322 | 13003320 | 31223320 | 31001120 | 31003302 |
| e3 | 03010323 | 12103010 | 10303230 | 23032321 | 12321210 | 03232123 | 01032303 | 32303212 |
| | 10303230 | 23032321 | 03010323 | 12103010 | 23210121 | 10121030 | 30103032 | 21010301 |
| e4 | 02223133 | 00023313 | 11310002 | 31332000 | 02221311 | 22203313 | 33130002 | 31330222 |
| | 02221311 | 00021131 | 33130002 | 13112000 | 20001311 | 00023313 | 33132220 | 31332000 | e1 + e2  4, 32, 128
e1 + e3  64, 128
e1 + e4  16, 32, 128

TABLE 18-continued

```
e2 + e3   4, 16, 32, 64, 128
e2 + e4   8, 16, 64, 128
e3 + e4   16, 64, 128
```

TABLE 19

$f(X) = 1 + X + X^3 + X^6 + X^7$
$g(X) = 3 + X + 2X^2 + 3X^3 + 2X^4 + 2X^5 + 3X^6 + X^7$

| | | | | | | | | |
|---|---|---|---|---|---|---|---|---|
| e1 | 03230103 | 30323212 | 03230103 | 12101030 | 10303032 | 01032101 | 32121210 | 01032101 |
|    | 12323230 | 03012303 | 30101012 | 03012303 | 23032123 | 10121232 | 23032123 | 32303010 |
| e2 | 03101201 | 30230310 | 10212312 | 01301021 | 32030130 | 01301021 | 21323023 | 30230310 |
|    | 30010332 | 21103001 | 23303221 | 10032330 | 23303221 | 32210112 | 30010332 | 03321223 |
| e3 | 00313302 | 02331322 | 31000233 | 11200031 | 22311102 | 02111300 | 13002033 | 11020013 |
|    | 31000233 | 11200031 | 00313302 | 02331322 | 31220211 | 33202231 | 00133320 | 20333122 |
| e4 | 02003313 | 02001131 | 31112220 | 31110002 | 22201333 | 00021333 | 11310200 | 33130200 |
|    | 00201311 | 00203133 | 33310222 | 33312000 | 20003331 | 02223331 | 13112202 | 31332202 |

```
e1 + e2   4, 8, 32, 128
e1 + e3   4, 16, 32, 64, 128
e1 + e4   16, 128
e2 + e3   4, 64, 128
e2 + e4   32, 128
e3 + e4   8, 128
```

TABLE 20

$f(X) = 1 + X + X^4 + X^6 + X^7$
$g(X) = 3 + X + 2X^2 + 2X^3 + X^4 + 2X^5 + 3X^6 + X^7$

| | | | | | | | | |
|---|---|---|---|---|---|---|---|---|
| e1 | 00313320 | 33022231 | 20333100 | 13002011 | 22311120 | 33202213 | 02331300 | 13222033 |
|    | 13222033 | 02331300 | 11020031 | 00133302 | 13002011 | 20333100 | 11200013 | 22131102 |
| e2 | 03321223 | 32030130 | 10032330 | 03101201 | 10032330 | 21323023 | 03321223 | 10212312 |
|    | 30230310 | 01121003 | 23123203 | 30010332 | 01301021 | 30010332 | 12012132 | 01121003 |
| e3 | 00131102 | 13002033 | 11020013 | 02113122 | 13000211 | 00133320 | 20333122 | 33200013 |
|    | 33022213 | 02333100 | 22133302 | 13222011 | 02331322 | 33020031 | 31002011 | 00313302 |
| e4 | 01302110 | 32211201 | 30231003 | 21100130 | 01302110 | 10033023 | 30231003 | 03322312 |
|    | 10033023 | 23120332 | 03322312 | 12013221 | 10033023 | 01302110 | 03322312 | 30231003 |

```
e1 + e2   4, 8, 16, 128
e1 + e3   16, 32, 128
e1 + e4   4, 8, 32, 128
e2 + e3   4, 128
e2 + e4   16, 64, 128
e3 + e4   4, 32, 128
```

TABLE 21

$f(X) = 1 + X^2 + X^4 + X^6 + X^7$
$g(X) = 3 + 2X + X^2 + X^4 + 2X^5 + 3X^6 + X^7$

| | | | | | | | | |
|---|---|---|---|---|---|---|---|---|
| e1 | 02001333 | 22023331 | 33310020 | 31110200 | 13330200 | 33312202 | 22021113 | 20221333 |
|    | 11132202 | 31110200 | 02001333 | 00201113 | 00203331 | 20221333 | 13330200 | 11130020 |
| e2 | 03230103 | 01032101 | 03012303 | 23032123 | 30321030 | 32123032 | 12321012 | 32301232 |
|    | 10123010 | 30103230 | 32123032 | 30321030 | 01210301 | 21230121 | 01032101 | 03230103 |
| e3 | 01030323 | 10301210 | 12101030 | 21012321 | 01030323 | 32123032 | 12101030 | 03230103 |
|    | 32123032 | 23212101 | 03230103 | 30323212 | 32123032 | 01030323 | 03230103 | 12101030 |
| e4 | 02223111 | 02001311 | 11310020 | 33310002 | 20223133 | 20001333 | 33310002 | 11310020 |
|    | 33132202 | 33310002 | 20001333 | 02001311 | 33310002 | 33132202 | 20223133 | 02223111 |

```
e1 + e2   32, 64, 128
e1 + e3   64, 128
e1 + e4   16, 64, 128
e2 + e3   64, 128
e2 + e4   8, 16, 64, 128
e3 + e4   8, 64, 128
```

TABLE 22

$f(X) = 1 + X^2 + X^5 + X^6 + X^7$
$g(X) = 3 + 2X + 3X^2 + 2X^3 + 2X^4 + X^5 + X^6 + X^7$

| | | | | | | | | |
|---|---|---|---|---|---|---|---|---|
| e1 | 00132011 | 13003302 | 20112231 | 11201300 | 13003302 | 00132011 | 33023122 | 02330013 |
|    | 20330031 | 11023100 | 22132033 | 31003320 | 33201322 | 02112213 | 31003320 | 22132033 |
| e2 | 03323221 | 32030310 | 30010112 | 01303023 | 32210332 | 03103203 | 23301223 | 12012312 |
|    | 30010112 | 23121201 | 21101003 | 32030310 | 23301223 | 30230130 | 10032110 | 03103203 |
| e3 | 00310233 | 33021322 | 31001120 | 02330031 | 20332231 | 31221102 | 33201300 | 22312033 |

TABLE 22-continued

|  |  |  |  |  |  |  |  |
|---|---|---|---|---|---|---|---|
|  | 20112213 | 31001120 | 11203100 | 00310233 | 00130211 | 33201300 | 13003320 | 20332231 |
| e4 | 01300112 | 32211021 | 12013001 | 03320310 | 03100332 | 30011201 | 32031003 | 23302312 |
|  | 30013023 | 21320332 | 23300130 | 10211003 | 32213203 | 23120112 | 03322132 | 30233001 |

| | |
|---|---|
| e1 + e2 | 4, 128 |
| e1 + e3 | 16, 32, 128 |
| e1 + e4 | 4, 32, 128 |
| e2 + e3 | 4, 8, 128 |
| e2 + e4 | 16, 64, 128 |
| e3 + e4 | 4, 8, 32, 128 |

TABLE 23

$f(X) = 1 + X + X^2 + X^3 + X^5 + X^6 + X^7$
$g(X) = 3 + 3X + X^2 + X^3 + 2X^4 + 3X^5 + X^6 + X^7$

| | | | | | | | | |
|---|---|---|---|---|---|---|---|---|
| e1 | 00021311 | 31112202 | 00021311 | 13330020 | 33130222 | 02003331 | 11312000 | 02003331 |
|  | 13332202 | 00023133 | 31110020 | 00023133 | 20223331 | 33132000 | 20223331 | 11310222 |
| e2 | 02113122 | 33022213 | 00313302 | 31222033 | 20333122 | 33020031 | 00311120 | 13002033 |
|  | 02111300 | 33020031 | 22133302 | 13002033 | 02113122 | 11200031 | 00313302 | 13000211 |
| e3 | 03010323 | 10301012 | 30321232 | 23030103 | 32123230 | 21232101 | 23030103 | 30321232 |
|  | 21010301 | 32301030 | 12321210 | 01030121 | 32301030 | 21010301 | 23212303 | 30103032 |
| e4 | 01033032 | 03011012 | 21233230 | 01033032 | 01213010 | 21013212 | 03231030 | 01213010 |
|  | 01211232 | 03233212 | 03233212 | 23033010 | 23213032 | 03013230 | 03013230 | 01031210 |

| | |
|---|---|
| e1 + e2 | 8, 16, 64, 128 |
| e1 + e3 | 8, 16, 32, 64, 128 |
| e1 + e4 | 16, 32, 64, 128 |
| e2 + e3 | 4, 8, 16, 64, 128 |
| e2 + e4 | 4, 8, 32, 64, 128 |
| e3 + e4 | 16, 32, 128 |

TABLE 24

$f(X) = 1 + X^4 + X^5 + X^6 + X^7$
$g(X) = 3 + 2X^2 + 2X^3 + 3X^4 + 3X^5 + X^6 + X^7$

| | | | | | | | | |
|---|---|---|---|---|---|---|---|---|
| e1 | 02112213 | 33023122 | 13223320 | 00130233 | 02330013 | 33201322 | 13001120 | 00312033 |
|  | 11201300 | 20330031 | 22312011 | 31001102 | 33201322 | 02330013 | 00312033 | 13001120 |
| e2 | 00021131 | 31112022 | 31332000 | 00201113 | 00023313 | 13332022 | 13112000 | 00203331 |
|  | 22201131 | 13332022 | 31330222 | 00203331 | 00021131 | 13330200 | 31332000 | 22023331 |
| e3 | 01032303 | 03012101 | 10303230 | 12323032 | 01212321 | 21010301 | 32301030 | 12103010 |
|  | 01210103 | 03230301 | 32303212 | 30323010 | 23212303 | 03010323 | 32123230 | 12321210 |
| e4 | 03013230 | 10302101 | 32300301 | 03233212 | 23211210 | 12322303 | 30320103 | 23031232 |
|  | 23033010 | 30322321 | 30102303 | 01031210 | 21013212 | 10120301 | 10300323 | 03011012 |

| | |
|---|---|
| e1 + e2 | 8, 16, 64, 128 |
| e1 + e3 | 4, 8, 32, 64, 128 |
| e1 + e4 | 4, 8, 64, 128 |
| e2 + e3 | 16, 32, 64, 128 |
| e2 + e4 | 8, 16, 32, 64, 128 |
| e3 + e4 | 16, 32, 128 |

TABLE 25

$f(X) = 1 + X + X^2 + X^4 + X^5 + X^6 + X^7$
$g(X) = 3 + 3X + X^2 + 2X^3 + 3X^4 + 3X^5 + X^6 + X^7$

| | | | | | | | | |
|---|---|---|---|---|---|---|---|---|
| e1 | 03320310 | 12013001 | 21100310 | 12011223 | 12233023 | 03100332 | 30013023 | 03102110 |
|  | 01302330 | 10031021 | 23122330 | 10033203 | 32033221 | 23300130 | 10213221 | 23302312 |
| e2 | 00203111 | 13330020 | 13330020 | 22021333 | 20003313 | 11312000 | 11312000 | 02221131 |
|  | 02003331 | 33312022 | 11130200 | 02003331 | 22203133 | 31330002 | 13112220 | 22203133 |
| e3 | 03230301 | 01210103 | 10301012 | 12321210 | 30323010 | 32303212 | 01030121 | 03010323 |
|  | 23032321 | 21012123 | 30103032 | 32123230 | 32303212 | 30323010 | 03010323 | 01030121 |
| e4 | 00313302 | 02111300 | 00133320 | 02331322 | 20331300 | 00311120 | 20111322 | 00131102 |
|  | 11022231 | 13220233 | 33020031 | 31222033 | 31000233 | 11020013 | 13002033 | 33022213 |

TABLE 25-continued

| | |
|---|---|
| e1 + e2 | 32, 64, 128 |
| e1 + e3 | 4, 16, 64, 128 |
| e1 + e4 | 4, 8, 128 |
| e2 + e3 | 8, 16, 32, 128 |
| e2 + e4 | 8, 32, 128 |
| e3 + e4 | 4, 8, 32, 64, 128 |

TABLE 26

$f(X) = 1 + X^2 + X^3 + X^4 + X^5 + X^6 + X^7$
$g(X) = 3 + 2X + X^2 + X^3 + 3X^4 + X^5 + X^6 + X^7$

| | | | | | | | | |
|---|---|---|---|---|---|---|---|---|
| e1 | 01122312 | 23302312 | 10033203 | 32213203 | 30233001 | 12013001 | 03100332 | 21320332 |
| | 23120112 | 01300112 | 32031003 | 10211003 | 30013023 | 12233023 | 03320310 | 21100310 |
| e2 | 00201131 | 22021131 | 00201131 | 00203313 | 11130002 | 33310002 | 33312220 | 33310002 |
| | 13332000 | 13330222 | 31110222 | 13330222 | 02003133 | 02001311 | 02003133 | 20223133 |
| e3 | 00023331 | 33312220 | 00201131 | 33130020 | 13110200 | 02003133 | 31110222 | 20003111 |
| | 33310002 | 22203331 | 33132202 | 22021131 | 02001311 | 31330200 | 20001333 | 13330222 |
| e4 | 01213212 | 32302321 | 30100323 | 21233032 | 10302303 | 01031012 | 03233010 | 30322123 |
| | 03013032 | 30102101 | 32300103 | 23033212 | 30320301 | 21013010 | 23211012 | 10300121 |

| | |
|---|---|
| e1 + e2 | 8, 32, 128 |
| e1 + e3 | 8, 16, 64, 128 |
| e1 + e4 | 4, 64, 128 |
| e2 + e3 | 64, 128 |
| e2 + e4 | 16, 64, 128 |
| e3 + e4 | 16, 32, 64, 128 |

In using mask functions for complex quasi-orthogonal sequences of length 128 as shown in Tables 9 to 26, it is also possible to use $e_i+W_k$ as complex quasi-orthogonal sequence masks instead of the above mask functions $e_i$. The complex quasi-orthogonal sequences generated by $e_i+W_k$ are equal to the complex quasi-orthogonal sequences generated by $e_i$. Therefore, the number of the masks which can be actually used, is $128 \times 128 \times 128 \times 128 = 128^4$ for the respective characteristic polynomials.

In this method, there exist 16 primitive polynomials of the $8^{th}$ degree; Tables 27 to 42 show mask functions for every complex quasi-orthogonal sequences of length 256 satisfying the three correlation conditions for the 16 primitive polynomials of the $8^{th}$ degree, respectively. Further, in using mask functions for complex quasi-orthogonal sequences of length 256, it is also possible to use $e_i+W_k$ as complex quasi-orthogonal sequence masks instead of the above mask functions $e_i$. At this point, the complex quasi-orthogonal sequences generated by $e_i+W_k$ are equal to the complex quasi-orthogonal sequences generated by $e_i$. Therefore, the number of the masks which can be actually used, is $256 \times 256 \times 256 \times 256 = 256^4$ for the respective characteristic polynomials.

TABLE 27

$f(X) = 1 + X^2 + X^3 + X^4 + X^8$
$g(X) = 1 + 2X + 3X^2 + X^3 + 3X^4 + 2X^5 + 2X^6 + X^8$

| | | | | | | | | |
|---|---|---|---|---|---|---|---|---|
| e1 | 03101021 | 23121201 | 21321021 | 23123023 | 03323221 | 23303001 | 21103221 | 23301223 |
| | 23123023 | 03103203 | 01303023 | 03101021 | 23301223 | 03321003 | 01121223 | 03323221 |
| | 30232312 | 32030310 | 12012312 | 32032132 | 30010112 | 32212110 | 12230112 | 32210332 |
| | 10210310 | 12012312 | 32030310 | 12010130 | 10032110 | 12230112 | 32212110 | 12232330 |
| e2 | 00023313 | 20221333 | 11132202 | 31330222 | 33132220 | 31112022 | 00201113 | 02221311 |
| | 20223111 | 00021131 | 13110222 | 33312202 | 31110200 | 33130002 | 20001311 | 22021113 |
| | 11132202 | 31330222 | 00023313 | 20221333 | 00201113 | 02221311 | 33132220 | 31112022 |
| | 31332000 | 11130020 | 02001333 | 22203313 | 02223133 | 00203331 | 13332022 | 11312220 |
| e3 | 02001311 | 31330200 | 02223111 | 31112000 | 22023313 | 11312202 | 22201113 | 11130002 |
| | 22021131 | 33132202 | 22203331 | 33310002 | 20221311 | 31332022 | 20003111 | 31110222 |
| | 11132220 | 22203331 | 33132202 | 00203313 | 31110222 | 02221333 | 13110200 | 20221311 |
| | 13330222 | 02223111 | 31330200 | 20223133 | 11130002 | 00023331 | 33130020 | 22023313 |
| e4 | 03011210 | 12322101 | 21231210 | 12320323 | 32122303 | 01033230 | 32120121 | 23213230 |
| | 23033212 | 10122321 | 23031030 | 32302321 | 12100301 | 03233010 | 30320301 | 03231232 |
| | 12322101 | 21233032 | 30102101 | 21231210 | 01033230 | 10300121 | 01031012 | 32120121 |
| | 32300103 | 23033212 | 32302321 | 01213212 | 21011232 | 12100301 | 03231232 | 12102123 |

| | |
|---|---|
| e1 + e2 | 8, 32, 64, 256 |
| e1 + e3 | 32, 64, 256 |
| e1 + e4 | 4, 8, 128, 256 |
| e2 + e3 | 16, 32, 128, 256 |
| e2 + e4 | 8, 32, 128, 256 |
| e3 + e4 | 16, 256 |

TABLE 28

$f(X) = 1 + X + X^3 + X^5 + X^8$
$g(X) = 1 + 3X + 2X^2 + X^3 + 3X^5 + X^8$

| | | | | | | | | |
|---|---|---|---|---|---|---|---|---|
| e1 | 00311120 | 20111322 | 13220233 | 11202213 | 22133302 | 02333100 | 13220233 | 11202213 |
| | 11022231 | 13000211 | 20331300 | 00131102 | 11022231 | 13000211 | 02113122 | 22313320 |
| | 22131120 | 02331322 | 13222011 | 11200031 | 22131120 | 02331322 | 31000233 | 33022213 |
| | 33202231 | 31220211 | 20333122 | 00133320 | 11020013 | 13002033 | 20333122 | 00133320 |
| e2 | 00311102 | 11022213 | 22131102 | 33202213 | 00311102 | 11022213 | 00313320 | 11020031 |
| | 22133320 | 11022213 | 00313320 | 33202213 | 22133320 | 11022213 | 22131102 | 11020031 |
| | 22131102 | 33202213 | 00311102 | 11022213 | 22131102 | 33202213 | 22133320 | 33200031 |
| | 00313320 | 33202213 | 22133320 | 11022213 | 00313320 | 33202213 | 00311102 | 33200031 |
| e3 | 01300332 | 01302110 | 12231021 | 30011021 | 30233221 | 12013221 | 01120310 | 01122132 |
| | 23120332 | 23122110 | 12233203 | 30013203 | 12013221 | 30233221 | 01122132 | 01120310 |
| | 23302132 | 01122132 | 30233221 | 30231003 | 12231021 | 12233203 | 23122110 | 01302110 |
| | 01122132 | 23302132 | 30231003 | 30233221 | 30011021 | 30013203 | 23120332 | 01300332 |
| e4 | 01212123 | 21232303 | 30323212 | 10303032 | 01210301 | 21230321 | 12103212 | 32123032 |
| | 12103212 | 10301210 | 01210301 | 03012303 | 30323212 | 32121210 | 01212123 | 03010121 |
| | 21012321 | 01032101 | 32301232 | 12321012 | 03232321 | 23212101 | 32303010 | 12323230 |
| | 32303010 | 30101012 | 03232321 | 01030323 | 32301232 | 30103230 | 21012321 | 23210323 |
| | e1 + e2 | 16, 256 | | | | | | |
| | e1 + e3 | 4, 16, 64, 256 | | | | | | |
| | e1 + e4 | 4, 8, 64, 256 | | | | | | |
| | e2 + e3 | 4, 8, 32, 64, 128 | | | | | | |
| | e2 + e4 | 4, 8, 64, 128, 256 | | | | | | |
| | e3 + e4 | 4, 16, 32, 128, 256 | | | | | | |

TABLE 29

$f(X) = 1 + X^2 + X^3 + X^5 + X^8$
$g(X) = 1 + 2X + X^2 + 3X^3 + X^5 + X^8$

| | | | | | | | | |
|---|---|---|---|---|---|---|---|---|
| e1 | 01030323 | 23210323 | 23032123 | 01212123 | 01212123 | 23032123 | 01032101 | 23212101 |
| | 32123032 | 32121210 | 10121232 | 10123010 | 10123010 | 10121232 | 10303032 | 10301210 |
| | 32123032 | 10303032 | 10121232 | 32301232 | 10123010 | 10303032 | 10123010 | 32123032 |
| | 23212101 | 23210323 | 01210301 | 01212123 | 23030301 | 23032123 | 23210323 | 23212101 |
| e2 | 01303023 | 32032132 | 32032132 | 23121201 | 30010112 | 21103221 | 21103221 | 12232330 |
| | 21321021 | 12010130 | 30232312 | 21321021 | 10032110 | 01121223 | 23303001 | 10032110 |
| | 10212132 | 23123023 | 23123023 | 32030310 | 03323221 | 12230112 | 12230112 | 21101003 |
| | 30230130 | 03101021 | 21323203 | 30230130 | 23301223 | 32212110 | 10030332 | 23301223 |
| e3 | 02221311 | 22023331 | 02003111 | 22201131 | 22023331 | 20003133 | 22201131 | 20221333 |
| | 13112000 | 33310020 | 31112022 | 11310002 | 11132202 | 13112000 | 33132220 | 31112022 |
| | 00201113 | 02221311 | 22201131 | 20221333 | 02221311 | 22023331 | 20221333 | 00023313 |
| | 33310020 | 31330222 | 33132220 | 31112022 | 13112000 | 33310020 | 13330200 | 33132220 |
| e4 | 02223111 | 13330222 | 20003111 | 31110222 | 02223111 | 13330222 | 02221333 | 13332000 |
| | 02223111 | 31112000 | 20003111 | 13332000 | 02223111 | 31112000 | 02221333 | 31110222 |
| | 02221333 | 13332000 | 20001333 | 31112000 | 02221333 | 13332000 | 02223111 | 13330222 |
| | 02221333 | 31110222 | 20001333 | 13330222 | 02221333 | 31110222 | 02223111 | 31112000 |
| | e1 + e2 | 4, 256 | | | | | | |
| | e1 + e3 | 64, 128, 256 | | | | | | |
| | e1 + e4 | 8, 16, 32, 128, 256 | | | | | | |
| | e2 + e3 | 8, 16, 32, 128, 256 | | | | | | |
| | e2 + e4 | 64, 128, 256 | | | | | | |
| | e3 + e4 | 16, 64, 256 | | | | | | |

50

TABLE 30

$f(X) = 1 + X^2 + X^3 + X^6 + X^8$
$g(X) = 1 + 2X + X^2 + X^3 + 2X^5 + 2X^7 + X^8$

| | | | | | | | | |
|---|---|---|---|---|---|---|---|---|
| e1 | 03103203 | 23123023 | 01121223 | 03323221 | 10210310 | 30230130 | 12232330 | 10030332 |
| | 23301223 | 21103221 | 21323203 | 01303023 | 12230112 | 10032110 | 10212132 | 30232312 |
| | 32212110 | 12232330 | 12012312 | 10210310 | 21101003 | 01121223 | 01301201 | 03103203 |
| | 12010130 | 10212132 | 32210332 | 12230112 | 23121201 | 21323203 | 03321003 | 23301223 |
| e2 | 02221311 | 33132220 | 02221311 | 11310002 | 20001311 | 11312220 | 20001311 | 33130002 |
| | 02221311 | 11310002 | 02221311 | 33132220 | 02223133 | 11312220 | 02223133 | 33130002 |
| | 20001311 | 11312220 | 02223133 | 11312220 | 02221311 | 33132220 | 20003133 | 33132220 |
| | 20001311 | 33130002 | 02223133 | 33130002 | 20003133 | 33132220 | 02221311 | 33132220 |
| e3 | 02110013 | 13221120 | 20330013 | 31001120 | 20112213 | 31223320 | 20110031 | 31221102 |

TABLE 30-continued

|   | | | | | | | | |
|---|---|---|---|---|---|---|---|---|
|   | 11023122 | 00312011 | 33203122 | 22132011 | 33021322 | 22310211 | 33023100 | 22312033 |
|   | 11201322 | 22312033 | 33021322 | 00132033 | 33203122 | 00310233 | 33201300 | 00312011 |
|   | 02332213 | 31221102 | 20112213 | 13001102 | 20330013 | 13223302 | 20332231 | 13221120 |
| e4 | 03233010 | 23213230 | 12322101 | 32302321 | 21013010 | 23211012 | 12320323 | 10122321 |
|   | 23031030 | 03011210 | 10302303 | 30322123 | 23033212 | 21231210 | 32122303 | 30320301 |
|   | 32300103 | 30102101 | 23211012 | 21013010 | 32302321 | 12322101 | 01031012 | 21011232 |
|   | 12102123 | 10300121 | 21231210 | 23033212 | 30322123 | 10302303 | 21233032 | 01213212 |
| e1 + e2 | 8, 16, 256 | | | | | | | |
| e1 + e3 | 4, 8, 256 | | | | | | | |
| e1 + e4 | 4, 8, 32, 64, 256 | | | | | | | |
| e2 + e3 | 8, 128, 256 | | | | | | | |
| e2 + e4 | 8, 32, 256 | | | | | | | |
| e3 + e4 | 4, 8, 32, 256 | | | | | | | |

15

TABLE 31

$f(X) = 1 + X + X^2 + X^3 + X^4 + X^6 + X^8$
$g(X) = 1 + X + X^2 + 3X^3 + X^4 + 3X^6 + 2X^7 + X^8$

|   | | | | | | | | |
|---|---|---|---|---|---|---|---|---|
| e1 | 03323221 | 01121223 | 01301201 | 21321021 | 23121201 | 03101021 | 03321003 | 01123001 |
|   | 32032132 | 12012312 | 12232330 | 10030332 | 12230112 | 10032110 | 10212132 | 30232312 |
|   | 23123023 | 03103203 | 21101003 | 23303001 | 21103221 | 23301223 | 01303023 | 21323203 |
|   | 12232330 | 10030332 | 32032132 | 12012312 | 10212132 | 30232312 | 12230112 | 10032110 |
| e2 | 00021333 | 22023133 | 13330002 | 13110020 | 33310222 | 11312022 | 02223331 | 02003313 |
|   | 33132022 | 11130222 | 02001131 | 02221113 | 00203133 | 22201333 | 13112202 | 13332220 |
|   | 20003331 | 02001131 | 11130222 | 11310200 | 31110002 | 13112202 | 22201333 | 22021311 |
|   | 31332202 | 13330002 | 22023133 | 22203111 | 20221131 | 02223331 | 11312022 | 11132000 |
| e3 | 00023111 | 22021311 | 02221113 | 20223313 | 00021333 | 00201311 | 20001113 | 20221131 |
|   | 33312000 | 33132022 | 13332220 | 13112202 | 33310222 | 11312022 | 31112220 | 13110020 |
|   | 00021333 | 00201311 | 02223331 | 02003313 | 22201333 | 00203133 | 02221113 | 20223313 |
|   | 33310222 | 11312022 | 13330002 | 31332202 | 11130222 | 11310200 | 13332220 | 13112202 |
| e4 | 01120130 | 23300130 | 03320310 | 03322132 | 30233001 | 30231223 | 32033221 | 10213221 |
|   | 30011201 | 12231201 | 32211021 | 32213203 | 23120112 | 23122330 | 21320332 | 03100332 |
|   | 01300112 | 23120112 | 03100332 | 03102110 | 12231201 | 12233023 | 10031021 | 32211021 |
|   | 30231223 | 12011223 | 32031003 | 32033221 | 01122312 | 01120130 | 03322132 | 21102132 |
| e1 + e2 | 8, 16, 256 | | | | | | | |
| e1 + e3 | 4, 8, 256 | | | | | | | |
| e1 + e4 | 4, 8, 32, 64, 256 | | | | | | | |
| e2 + e3 | 8, 128, 256 | | | | | | | |
| e2 + e4 | 8, 32, 256 | | | | | | | |
| e3 + e4 | 4, 8, 32, 256 | | | | | | | |

TABLE 32

$f(X) = 1 + X + X^5 + X^6 + X^8$
$g(X) = 1 + 3X + 2X^4 + 3X^5 + X^6 + 2X^7 + X^8$

|   | | | | | | | | |
|---|---|---|---|---|---|---|---|---|
| e1 | 03232321 | 32121210 | 10301210 | 21012321 | 23030301 | 30101012 | 12321012 | 01210301 |
|   | 32301232 | 03012303 | 21232303 | 10121232 | 12103212 | 01032101 | 23212101 | 30323212 |
|   | 01210301 | 12321012 | 12323230 | 01212123 | 03230103 | 32123032 | 32121210 | 03232321 |
|   | 30323212 | 23212101 | 23210323 | 30321030 | 32303010 | 03010121 | 03012303 | 32301232 |
| e2 | 01211030 | 03013032 | 30320301 | 32122303 | 30322123 | 32120121 | 23031030 | 21233032 |
|   | 01213212 | 21233032 | 12100301 | 32120121 | 12102123 | 32122303 | 23033212 | 03013032 |
|   | 23211012 | 03231232 | 30102101 | 10122321 | 12322101 | 32302321 | 23213230 | 03233010 |
|   | 23213230 | 21011232 | 12322101 | 10120103 | 30102101 | 32300103 | 23211012 | 21013010 |
| e3 | 00201311 | 11130222 | 20221131 | 13332220 | 00201311 | 11130222 | 02003313 | 31110002 |
|   | 22201333 | 11312022 | 20003331 | 31332202 | 22201333 | 11312022 | 02221113 | 13110020 |
|   | 20221131 | 13332220 | 00201311 | 11130222 | 20221131 | 13332220 | 22023133 | 33312000 |
|   | 20003331 | 31332202 | 22201333 | 11312022 | 20003331 | 31332202 | 00023111 | 33130200 |
| e4 | 00203133 | 33310222 | 31330020 | 20001113 | 22023133 | 33312000 | 31332202 | 02221113 |
|   | 11310200 | 22203111 | 20223313 | 31112220 | 33130200 | 22201333 | 20221131 | 13332220 |
|   | 00201311 | 11130222 | 31332202 | 02221113 | 00203133 | 33310222 | 13112202 | 02223331 |
|   | 11312022 | 00023111 | 20221131 | 13332220 | 11310200 | 22203111 | 02001131 | 13330002 |
| e1 + e2 | 16, 32, 128, 256 | | | | | | | |
| e1 + e3 | 16, 32, 64, 128, 256 | | | | | | | |
| e1 + e4 | 16, 256 | | | | | | | |
| e2 + e3 | 8, 256 | | | | | | | |
| e2 + e4 | 8, 32, 256 | | | | | | | |
| e3 + e4 | 256 | | | | | | | |

TABLE 33

$f(X) = 1 + X^2 + X^5 + X^6 + X^8$
$g(X) = 1 + 2X + X^2 + 2X^3 + X^5 + X^6 + 2X^7 + X^8$

| | | | | | | | | |
|---|---|---|---|---|---|---|---|---|
| e1 | 01120130 | 03100332 | 30233001 | 32213203 | 23302312 | 21322110 | 30233001 | 32213203 |
| | 32033221 | 30013023 | 21102132 | 23122330 | 10211003 | 12231201 | 21102132 | 23122330 |
| | 12011223 | 10031021 | 23302312 | 21322110 | 30233001 | 32213203 | 23302312 | 21322110 |
| | 03320310 | 01300112 | 10211003 | 12231201 | 21102132 | 23122330 | 10211003 | 12231201 |
| e2 | 00130211 | 22132011 | 13221120 | 31223320 | 22310211 | 22130233 | 13223302 | 13003320 |
| | 33023100 | 33203122 | 20332231 | 20112213 | 11203100 | 33201300 | 20330013 | 02332213 |
| | 22310211 | 22130233 | 31001120 | 31221102 | 22312033 | 00310233 | 13221120 | 31223320 |
| | 11203100 | 33201300 | 02112231 | 20110031 | 11201322 | 11021300 | 20332231 | 20112213 |
| e3 | 03323221 | 10212132 | 01121223 | 12010130 | 32212110 | 03101021 | 30010112 | 01303023 |
| | 23121201 | 30010112 | 21323203 | 32212110 | 30232312 | 01121223 | 32030310 | 03323221 |
| | 10210310 | 21103221 | 12012312 | 23301223 | 21321021 | 32210332 | 23123023 | 30012330 |
| | 30012330 | 01301201 | 32210332 | 03103203 | 23301223 | 30230130 | 21103221 | 32032132 |
| e4 | 02223133 | 33310020 | 22023331 | 13110222 | 13110222 | 22023331 | 11132202 | 20001311 |
| | 33310020 | 20001311 | 13110222 | 00201113 | 00201113 | 13110222 | 02223133 | 11132202 |
| | 33132220 | 20223111 | 31110200 | 22201131 | 00023313 | 13332022 | 20223111 | 33132220 |
| | 02001333 | 33132220 | 00023313 | 31110200 | 13332022 | 22201131 | 33132220 | 02001333 |
| | e1 + e2 | 4, 8, 128, 256 | | | | | | |
| | e1 + e3 | 16, 32, 128, 256 | | | | | | |
| | e1 + e4 | 16, 32, 256 | | | | | | |
| | e2 + e3 | 4, 8, 128, 256 | | | | | | |
| | e2 + e4 | 8, 16, 256 | | | | | | |
| | e3 + e4 | 8, 16, 64, 128, 256 | | | | | | |

TABLE 34

$f(X) = 1 + X^3 + X^5 + X^6 + X^7$
$g(X) = 1 + X^3 + 3X^5 + X^6 + 2X^7 + X^8$

| | | | | | | | | |
|---|---|---|---|---|---|---|---|---|
| e1 | 03233212 | 23033010 | 03011012 | 01033032 | 21013212 | 23031232 | 03013230 | 23213032 |
| | 12322303 | 32122101 | 12100103 | 10122123 | 30102303 | 32120323 | 12102321 | 32302123 |
| | 10122123 | 30322321 | 32122101 | 30100121 | 32302123 | 30320103 | 32120323 | 12320121 |
| | 23211210 | 03011012 | 01211232 | 03233212 | 01031210 | 03013230 | 01213010 | 21013212 |
| e2 | 00310211 | 13221102 | 20112231 | 33023122 | 33023122 | 20112231 | 31003320 | 22132033 |
| | 31003320 | 00310211 | 11201300 | 20112231 | 20112231 | 11201300 | 22132033 | 13221102 |
| | 13003302 | 22310233 | 11023100 | 20330031 | 02112213 | 33201322 | 22310233 | 13003302 |
| | 22310233 | 31221120 | 20330031 | 33201322 | 11023100 | 02112213 | 31221120 | 22310233 |
| e3 | 03321223 | 03103023 | 01121003 | 01303203 | 03321223 | 03103023 | 23303221 | 23121021 |
| | 01303203 | 23303221 | 21321201 | 03321223 | 23121021 | 01121003 | 21321201 | 03321223 |
| | 10212312 | 32212330 | 12012132 | 30012110 | 32030130 | 30030112 | 12012132 | 30012110 |
| | 12230332 | 12012132 | 32212330 | 32030130 | 12230332 | 12012132 | 10030112 | 10212312 |
| e4 | 02003111 | 00023313 | 13112000 | 11132202 | 13110222 | 11130020 | 20223111 | 22203313 |
| | 13330200 | 33132220 | 02221311 | 22023331 | 02223133 | 22021113 | 31110200 | 11312220 |
| | 22203313 | 02001333 | 11130020 | 31332000 | 11132202 | 31330222 | 00023313 | 20221333 |
| | 11312220 | 13332022 | 22021113 | 20001311 | 22023331 | 20003133 | 33132220 | 31112022 |
| | e1 + e2 | 4, 8, 64, 128, 256 | | | | | | |
| | e1 + e3 | 4, 8, 128, 256 | | | | | | |
| | e1 + e4 | 8, 64, 128, 256 | | | | | | |
| | e2 + e3 | 4, 8, 32, 128, 256 | | | | | | |
| | e2 + e4 | 8, 128, 256 | | | | | | |
| | e3 + e4 | 8, 16, 32, 256 | | | | | | |

TABLE 35

$f(X) = 1 + X^4 + X^5 + X^6 + X^8$
$g(X) = 1 + 2X^2 + 2X^3 + 3X^4 + X^5 + 3X^6 + 2X^7 + X^8$

| | | | | | | | | |
|---|---|---|---|---|---|---|---|---|
| e1 | 02330013 | 11023100 | 20112231 | 11023100 | 20332213 | 11203122 | 02110031 | 11203122 |
| | 22312011 | 13223320 | 00130233 | 13223320 | 22132033 | 31221120 | 00310211 | 31221120 |
| | 11023100 | 02330013 | 33201322 | 02330013 | 11203122 | 20332213 | 33021300 | 20332213 |
| | 13223320 | 22312011 | 31001102 | 22312011 | 31221120 | 22132033 | 13003302 | 22132033 |
| e2 | 01300332 | 30233221 | 32213023 | 21102312 | 21100130 | 10033023 | 30231003 | 23120332 |
| | 32031223 | 21320112 | 23300310 | 12233203 | 12231021 | 01120310 | 21322330 | 10211223 |
| | 10211223 | 21322330 | 23302132 | 30013203 | 30011021 | 01122132 | 21320112 | 32031223 |
| | 01302110 | 12013221 | 10033023 | 21100130 | 21102312 | 32213023 | 12011003 | 23122110 |
| e3 | 00021131 | 31112022 | 20221333 | 11312220 | 11132202 | 02223133 | 31332000 | 22023331 |
| | 22023331 | 31332000 | 02223133 | 11132202 | 33130002 | 02003111 | 13330200 | 22203313 |
| | 20221333 | 11312220 | 00021131 | 31112022 | 33332000 | 22023331 | 11132202 | 02223133 |
| | 20001311 | 33310020 | 00201113 | 13110222 | 31112022 | 00021131 | 11312220 | 20221333 |

TABLE 35-continued

| | | | | | | | | |
|---|---|---|---|---|---|---|---|---|
| e4 | 03323001 | 12230332 | 32212330 | 01123221 | 12012132 | 21323023 | 01301021 | 10212312 |
| | 23303221 | 32210112 | 12232110 | 21103001 | 10210130 | 23121021 | 03103023 | 12010310 |
| | 12230332 | 03323001 | 01123221 | 32212330 | 03101201 | 30230310 | 32030130 | 23123203 |
| | 32210112 | 23303221 | 21103001 | 12232110 | 01303203 | 32032312 | 30232132 | 21321201 |
| e1 + e2 | 4, 8, 32, 128, 256 | | | | | | | |
| e1 + e3 | 8, 16, 256 | | | | | | | |
| e1 + e4 | 4, 8, 32, 64, 256 | | | | | | | |
| e2 + e3 | 64, 128, 256 | | | | | | | |
| e2 + e4 | 16, 32, 128, 256 | | | | | | | |
| e3 + e4 | 8, 32, 64, 128, 256 | | | | | | | |

TABLE 36

$f(X) = 1 + X + X^2 + X^7 + X^8$
$g(X) = 1 + X + X^2 + 2X^5 + 3X^7 + X^8$

| | | | | | | | | |
|---|---|---|---|---|---|---|---|---|
| e1 | 00131120 | 22131102 | 31220233 | 13220211 | 22133320 | 22311120 | 13222033 | 13000233 |
| | 31002033 | 13002011 | 22131102 | 00131120 | 31222011 | 31000211 | 22311120 | 22133320 |
| | 02331300 | 20331322 | 33020013 | 11020031 | 02111322 | 02333122 | 33200031 | 33022231 |
| | 33202213 | 11202231 | 20331322 | 02331300 | 11200013 | 11022213 | 02333122 | 02111322 |
| e2 | 01033032 | 01213010 | 21231012 | 21011030 | 21011030 | 21231012 | 23031232 | 23211210 |
| | 23031232 | 01033032 | 03233212 | 21231012 | 21231012 | 03233212 | 23211210 | 01213010 |
| | 23033010 | 23213032 | 03231030 | 03011012 | 21233230 | 21013212 | 23213032 | 23033010 |
| | 23213032 | 01211232 | 03011012 | 21013212 | 03231030 | 21233230 | 01211232 | 23213032 |
| e3 | 01121223 | 30232312 | 03323221 | 32030310 | 01121223 | 30232312 | 21101003 | 10212132 |
| | 30010112 | 01303023 | 32212110 | 03101021 | 12232330 | 23121201 | 32212110 | 03101021 |
| | 32032132 | 21103221 | 30230130 | 23301223 | 10210310 | 03321003 | 30230130 | 23301223 |
| | 21321021 | 32210332 | 23123023 | 30012330 | 21321021 | 32210332 | 01301201 | 12230112 |
| e4 | 00131102 | 31220211 | 22131120 | 13220233 | 13002033 | 00131102 | 31002011 | 22131120 |
| | 33200013 | 20333122 | 33022213 | 20111322 | 20333122 | 11022231 | 20111322 | 11200031 |
| | 13002033 | 00131102 | 13220233 | 00313302 | 22313320 | 13002033 | 22131120 | 13220233 |
| | 20333122 | 11022231 | 02333100 | 33022213 | 11022231 | 02111300 | 33022213 | 20111322 |
| e1 + e2 | 4, 16, 64, 256 | | | | | | | |
| e1 + e3 | 4, 32, 128, 256 | | | | | | | |
| e1 + e4 | 16, 256 | | | | | | | |
| e2 + e3 | 4, 16, 32, 128, 256 | | | | | | | |
| e2 + e4 | 4, 8, 32, 64, 256 | | | | | | | |
| e3 + e4 | 4, 8, 64, 128, 256 | | | | | | | |

TABLE 37

$f(X) = 1 + X^2 + X^3 + X^7 + X^8$
$g(X) = 1 + 2X + X^2 + 3X^3 + 2X^4 + 3X^7 + X^8$

| | | | | | | | | |
|---|---|---|---|---|---|---|---|---|
| e1 | 03320310 | 03322132 | 21322110 | 21320332 | 23122330 | 23120112 | 01120130 | 01122312 |
| | 32031003 | 32033221 | 10033203 | 10031021 | 12233023 | 12231201 | 30231223 | 30233001 |
| | 21322110 | 21320332 | 03320310 | 03322132 | 01120130 | 01122312 | 23122330 | 23120112 |
| | 32211021 | 32213203 | 10213221 | 10211003 | 12013001 | 12011223 | 30011201 | 30013023 |
| e2 | 02110013 | 02112231 | 02330031 | 20110031 | 11203100 | 11201322 | 11023122 | 33203122 |
| | 13223302 | 13221120 | 31221102 | 13001102 | 22312033 | 22310211 | 00310233 | 22130233 |
| | 02112231 | 20332231 | 02332213 | 02330031 | 11201322 | 33021322 | 11021300 | 11023122 |
| | 31003302 | 13223302 | 13001102 | 13003320 | 00132033 | 22312033 | 22130233 | 22132011 |
| e3 | 03012303 | 32301232 | 10121232 | 21232303 | 32123032 | 03230103 | 21010103 | 10303032 |
| | 23032123 | 30103230 | 12323230 | 01212123 | 12103212 | 01032101 | 23212101 | 30323212 |
| | 32123032 | 03230103 | 03232321 | 32121210 | 21230121 | 10123010 | 10121232 | 21232303 |
| | 12103212 | 01032101 | 01030323 | 12101030 | 01210301 | 12321012 | 12323230 | 01212123 |
| e4 | 02223111 | 02221333 | 20221311 | 02001311 | 00201131 | 00203313 | 00021113 | 22201113 |
| | 31110222 | 13330222 | 13112022 | 13110200 | 33132202 | 11312202 | 33312220 | 33310002 |
| | 02221333 | 02223111 | 20223133 | 02003133 | 00203313 | 00201131 | 00023331 | 22203331 |
| | 13330222 | 31110222 | 31332022 | 31330200 | 11312202 | 33132202 | 11132220 | 11130002 |
| e1 + e2 | 4, 8, 32, 256 | | | | | | | |
| e1 + e3 | 4, 8, 32, 64, 256 | | | | | | | |
| e1 + e4 | 8, 32, 256 | | | | | | | |
| e2 + e3 | 4, 8, 256 | | | | | | | |
| e2 + e4 | 8, 128, 256 | | | | | | | |
| e3 + e4 | 8, 16, 256 | | | | | | | |

TABLE 38

$f(X) = 1 + X^3 + X^5 + X^7 + X^8$
$g(X) = 1 + 3X^3 + X^5 + 2X^6 + 3X^7 + X^8$

| | | | | | | | | |
|---|---|---|---|---|---|---|---|---|
| e1 | 03233212 | 01211232 | 32300301 | 30322321 | 21011030 | 23033010 | 32300301 | 30322321 |
| | 32122101 | 12322303 | 21233230 | 01033032 | 32122101 | 12322303 | 03011012 | 23211210 |
| | 12102321 | 32302123 | 23031232 | 03231030 | 12102321 | 32302123 | 01213010 | 21013212 |
| | 01031210 | 03013230 | 12320121 | 10302101 | 23213032 | 21231012 | 12320121 | 10302101 |
| e2 | 02332213 | 13221120 | 00130211 | 11023122 | 22130233 | 33023100 | 20332231 | 32130233 |
| | 02330031 | 13223302 | 22310211 | 33203122 | 00310233 | 11203100 | 20330013 | 31223320 |
| | 20112213 | 13223302 | 22310211 | 11021300 | 22132011 | 11203100 | 20330013 | 13001102 |
| | 02332213 | 31003302 | 22312033 | 11023122 | 22130233 | 11201322 | 02110013 | 31221102 |
| e3 | 03323001 | 10210130 | 23123203 | 30010332 | 12230332 | 23121021 | 32030130 | 03321223 |
| | 12012132 | 23303221 | 32212330 | 03103023 | 21323023 | 32210112 | 01123221 | 12010310 |
| | 01123221 | 12010310 | 21323023 | 32210112 | 10030112 | 21321201 | 30230310 | 01121003 |
| | 32030130 | 03321223 | 12230332 | 23121021 | 01301021 | 12232110 | 21101223 | 32032312 |
| e4 | 02332213 | 02112231 | 11023122 | 11203100 | 13223302 | 31221102 | 00132033 | 22130233 |
| | 11021300 | 33023100 | 02330031 | 20332231 | 22312033 | 22132011 | 31003302 | 31223320 |
| | 31223320 | 13221120 | 00310233 | 22312033 | 20332231 | 20112213 | 11201322 | 11021300 |
| | 00312011 | 00132033 | 31221102 | 31001120 | 33021322 | 11023122 | 02112231 | 20110031 | e1 + e2  4, 16, 32, 64, 128, 256
e1 + e3  4, 8, 32, 128, 256
e1 + e4  4, 256
e2 + e3  4, 16, 32, 64, 128, 256
e2 + e4  64, 256
e3 + e4  4, 32, 256

TABLE 39

$f(X) = 1 + X + X^6 + X^7 + X^8$
$g(X) = 1 + 3X + 2X^3 + X^6 + X^7 + X^8$

| | | | | | | | | |
|---|---|---|---|---|---|---|---|---|
| e1 | 00131120 | 33200031 | 31002033 | 02333122 | 13000233 | 20331322 | 22133320 | 11202231 |
| | 22311120 | 33202213 | 13222033 | 02331300 | 13002011 | 02111322 | 22131102 | 33022231 |
| | 22311120 | 11020031 | 13222033 | 20113122 | 13002011 | 20333100 | 22131102 | 11200013 |
| | 22313302 | 33200031 | 13220211 | 02333122 | 31222011 | 20331322 | 00311102 | 11202231 |
| e2 | 01123221 | 23123203 | 21101223 | 03101201 | 01123221 | 23123203 | 03323001 | 21323023 |
| | 21323023 | 21101223 | 23123203 | 23301003 | 03101201 | 03323001 | 23123203 | 23301003 |
| | 12010310 | 12232110 | 32032312 | 32210112 | 30232132 | 30010332 | 30232312 | 32210112 |
| | 32210112 | 10210130 | 30010332 | 12010310 | 32210112 | 10210130 | 12232110 | 30232132 |
| e3 | 02331322 | 33020031 | 31222033 | 22311102 | 13222011 | 22133302 | 02113122 | 11020013 |
| | 11200031 | 20111322 | 22313320 | 31220211 | 00313302 | 31002011 | 11022231 | 02111300 |
| | 31222033 | 22311102 | 02331322 | 33020031 | 02113122 | 11020013 | 13222011 | 22133302 |
| | 00131102 | 13002033 | 33022213 | 02333100 | 33200013 | 20333122 | 22131120 | 13220233 |
| e4 | 03101201 | 03323001 | 12012132 | 30012110 | 21321201 | 03321223 | 12010310 | 12232110 |
| | 23123203 | 01123221 | 10212312 | 10030112 | 23121021 | 23303221 | 32032312 | 10032330 |
| | 23303221 | 01303203 | 32210112 | 32032312 | 23301003 | 23123203 | 10030112 | 32030130 |
| | 21103001 | 21321201 | 12232110 | 30232132 | 03323001 | 21323023 | 12230332 | 12012132 | e1 + e2  4, 8, 64, 256
e1 + e3  16, 256
e1 + e4  4, 8, 32, 64, 128, 256
e2 + e3  4, 16, 128, 256
e2 + e4  256
e3 + e4  4, 16, 32, 64, 128, 256

50

TABLE 40

$f(X) = 1 + X + X^2 + X^3 + X^6 + X^7 + X^8$
$g(X) = 1 + X + 3X^2 + X^3 + 2X^4 + X^6 + X^7 + X^8$

| | | | | | | | | |
|---|---|---|---|---|---|---|---|---|
| e1 | 02003313 | 20001113 | 11130222 | 13310200 | 22021311 | 22201333 | 31112220 | 13110020 |
| | 20223313 | 02221113 | 11132000 | 11312022 | 22023133 | 22203111 | 13332220 | 31330020 |
| | 20223313 | 20003331 | 33310222 | 11312022 | 22023133 | 00021333 | 31110002 | 31330020 |
| | 20221131 | 20001113 | 11130222 | 33132022 | 00203133 | 22201333 | 31112220 | 31332202 |
| e2 | 01122312 | 23302312 | 30231223 | 30233001 | 10211003 | 10213221 | 21102132 | 03322132 |
| | 30011201 | 30013023 | 01302330 | 23122330 | 03100332 | 21320332 | 32213203 | 32211021 |
| | 32033221 | 32031003 | 21102132 | 03322132 | 01122312 | 23302312 | 12013001 | 12011223 |
| | 21322110 | 03102110 | 32213203 | 32211021 | 30011201 | 30013023 | 23120112 | 01300112 |
| e3 | 02331322 | 22131120 | 00313302 | 02331322 | 11022231 | 31222033 | 13000211 | 11022231 |
| | 11020013 | 13002033 | 13002033 | 33202231 | 20111322 | 22133302 | 22133302 | 02333100 |
| | 22313320 | 20331300 | 02113122 | 22313320 | 13222011 | 11200031 | 33022213 | 13222011 |
| | 31002011 | 11202213 | 11202213 | 13220233 | 22311102 | 02111300 | 02111300 | 00133320 |

TABLE 40-continued

| | | | | | | | | |
|---|---|---|---|---|---|---|---|---|
| e4 | 03100332 | 03102110 | 21102132 | 21100310 | 01120130 | 01122312 | 23122330 | 23120112 |
| | 32211021 | 32213203 | 10213221 | 10211003 | 30231223 | 30233001 | 12233023 | 12231201 |
| | 03320310 | 03322132 | 21322110 | 21320332 | 01300112 | 01302330 | 23302312 | 23300130 |
| | 10213221 | 10211003 | 32211021 | 32213203 | 12233023 | 12231201 | 30231223 | 30233001 |
| | e1 + e2 | 8, 32, 64, 128, 256 | | | | | | |
| | e1 + e3 | 8, 16, 256 | | | | | | |
| | e1 + e4 | 8, 128, 256 | | | | | | |
| | e2 + e3 | 4, 8, 32, 256 | | | | | | |
| | e2 + e4 | 256 | | | | | | |
| | e3 + e4 | 4, 8, 256 | | | | | | |

TABLE 41

$f(X) = 1 + X + X^2 + X^5 + X^6 + X^7 + X^8$
$g(X) = 1 + X + X^2 + 2X^4 + X^5 + 3X^6 + X^7 + X^8$

| | | | | | | | | |
|---|---|---|---|---|---|---|---|---|
| e1 | 02111300 | 11022231 | 20111322 | 33022213 | 00131102 | 31220211 | 00313302 | 31002011 |
| | 11200031 | 20111322 | 11022231 | 20333122 | 13220233 | 00313302 | 31220211 | 22313320 |
| | 22133302 | 31000233 | 22311102 | 31222033 | 02331322 | 33020031 | 20331300 | 11020013 |
| | 31222033 | 00133320 | 13222011 | 22133302 | 11020013 | 02113122 | 11202213 | 02331322 |
| e2 | 01213010 | 01033032 | 21011030 | 21231012 | 12320121 | 12100103 | 32122101 | 32302123 |
| | 32302123 | 32122101 | 12100103 | 12320121 | 03013230 | 03233212 | 23211210 | 23031232 |
| | 03233212 | 03013230 | 23031232 | 23211210 | 10300323 | 10120301 | 30102303 | 30322321 |
| | 12100103 | 12320121 | 32302123 | 32122101 | 23211210 | 23031232 | 03013230 | 03233212 |
| e3 | 00201311 | 22021311 | 00021333 | 00023111 | 02001131 | 20221131 | 02221113 | 02223331 |
| | 33132022 | 11312022 | 11130222 | 11132000 | 31332202 | 13112202 | 13330002 | 13332220 |
| | 22021311 | 22023133 | 22201333 | 00021333 | 20221131 | 20223313 | 20001113 | 02221113 |
| | 33130200 | 33132022 | 11132000 | 33312000 | 31330020 | 31332202 | 13332220 | 31112220 |
| e4 | 01122312 | 32033221 | 10211003 | 01122312 | 23300130 | 10211003 | 10211003 | 01122312 |
| | 21320332 | 12231201 | 12231201 | 03102110 | 21320332 | 12231201 | 30013023 | 21320332 |
| | 30231223 | 21102132 | 21102132 | 12013001 | 30231223 | 21102132 | 03320310 | 30231223 |
| | 10033203 | 01300112 | 23122330 | 10033203 | 32211021 | 23122330 | 23122330 | 10033203 |
| | e1 + e2 | 4, 8, 32, 256 | | | | | | |
| | e1 + e3 | 8, 128, 256 | | | | | | |
| | e1 + e4 | 4, 8, 128, 256 | | | | | | |
| | e2 + e3 | 8, 16, 256 | | | | | | |
| | e2 + e4 | 4, 8, 128, 256 | | | | | | |
| | e3 + e4 | 8, 256 | | | | | | |

TABLE 42

$f(X) = 1 + X^2 + X^4 + X^5 + X^6 + X^7 + X^8$
$g(X) = 1 + 2X + 3X^2 + X^4 + 3X^5 + X^6 + X^7 + X^8$

| | | | | | | | | |
|---|---|---|---|---|---|---|---|---|
| e1 | 01211030 | 23031030 | 03233010 | 03231232 | 32300103 | 32302321 | 30322123 | 12102123 |
| | 12322101 | 12320323 | 32122303 | 10302303 | 03011210 | 21231210 | 23211012 | 23213230 |
| | 10122321 | 10120103 | 30322123 | 12102123 | 01211030 | 23031030 | 21011232 | 21013010 |
| | 21233032 | 03013032 | 23211012 | 23213230 | 12322101 | 12320323 | 10300121 | 32120121 |
| e2 | 00312011 | 11201322 | 31221102 | 20332231 | 22130233 | 33023100 | 31221102 | 20332231 |
| | 22312033 | 11023122 | 31003302 | 02332213 | 00130211 | 33201300 | 31003302 | 02332213 |
| | 31221102 | 20332231 | 00312011 | 11201322 | 13003320 | 02110013 | 00312011 | 11201322 |
| | 31003302 | 02332213 | 22312033 | 11023122 | 13221120 | 20110031 | 22312033 | 11023122 |
| e3 | 02221333 | 02003133 | 22023313 | 22201113 | 31110222 | 13110200 | 11312202 | 33312220 |
| | 20221311 | 20003111 | 00023331 | 00201131 | 13110200 | 31110222 | 33312220 | 11312202 |
| | 33130020 | 33312220 | 31110222 | 31332022 | 22023313 | 00023331 | 20003111 | 02003133 |
| | 33312220 | 33130020 | 31332022 | 31110222 | 22201113 | 00201131 | 20221311 | 02221333 |
| e4 | 03232321 | 23212101 | 10121232 | 30101012 | 10301210 | 30321030 | 21230121 | 01210301 |
| | 23032123 | 21230121 | 12103212 | 10301210 | 12323230 | 10121232 | 01030323 | 03232321 |
| | 23210323 | 21012321 | 30103230 | 32301232 | 12101030 | 10303032 | 23030301 | 21232303 |
| | 21232303 | 01212123 | 10303032 | 30323212 | 32301232 | 12321012 | 21012321 | 01032101 |
| | e1 + e2 | 4, 8, 128, 256 | | | | | | |
| | e1 + e3 | 16, 32, 256 | | | | | | |
| | e1 + e4 | 16, 32, 128, 256 | | | | | | |
| | e2 + e3 | 8, 16, 256 | | | | | | |
| | e2 + e4 | 4, 8, 128, 256 | | | | | | |
| | e3 + e4 | 8, 16, 128, 256 | | | | | | |

The mask values in Tables 27 to 42 are expressed in quaternary number. Further, the quaternary mask values in Tables 27 to 42 can be expressed as complex numbers, wherein "0" represents "1", "1" represents "j", "2" represents "−1" and "3" represents "−j". Therefore, it is noted that the complex numbers can be expressed with 1, j, −1 and −j. Actually, however, in an IS-95 CDMA communication system, complex numbers are expressed with "1+j". "−1+1", "1j" and "1−j".

Figure 9:
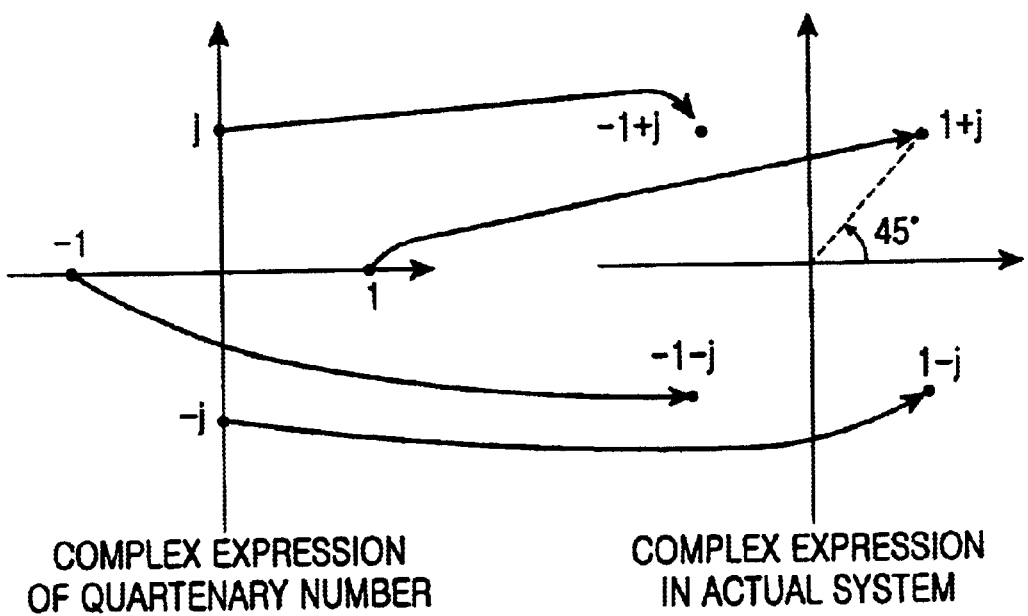
FIG. 9 is a diagram comparing the complex expression for quaternary numbers and the complex expression for signal transmission in a system on a complex plane.

FIG. 9 compares the complex expression for quaternary numbers on the left and the complex expression for signal transmission in an actual system on the right on a complex plane. To convert mask values into the complex expressions used in the actual system, "1+j" is transmitted for "0", "−1+j" for "1", "−1−j" for "2" and "1−j" for 3. This relationship is equivalent to rotating the quaternary complex expression of 1, j, −1 and −j by 45°, and can be obtained by multiplying the quaternary complex expression by "1+j". By using the above relationship, the quaternary mask values can be converted to the complex expression of "1+j", "−1+1", "−1−j" and "1−j", and they can be divided into a real part I and an imaginary part Q. Tables 43 and 44 express the mask values of Tables 38 and 23 in hexadecimal values divided into the real part I and the imaginary part Q. In particular, Tables 38 and 23 show the good partial correlation property of Condition 4 for the full lengths 256 and 128, respectively.

TABLE 43

$f(X) = 1 + X^3 + X^5 + X^7 + X^8$
$g(X) = 1 + 3X^3 + X^5 + 2X^6 + 3X^7 + X^8$

| | | |
|---|---|---|
| e1 | I | 277d411bd882411b7dd8e4417dd81bbeeb4e8d28eb4e72d74e14d76db1ebd78d |
| | Q | 7d27e4be82d8e4bed87dbe1bd87d41e44eebd7724eeb288d144e7228ebb17228 |
| e2 | I | 4ebe27d7e4148d7d41b1d72714e48272beb1d7d8ebe4828d4e41d8d7e4eb727d |
| | Q | 7d72141bd7d8beb1727de4eb2728b1be8d7de414d826b1417d6deb1bd72741b1 |
| e3 | I | 11b4b411e1bb441edd677822d27777d277d2d27787dd2278441ee1bb4beeee4b |
| | Q | 7822dd8777d2d2774beeee4bbbe11e441e44bbe111b4b411d27777d2227867dd |
| e4 | I | 4e7dd7e4b17d28e4d814418dd8eb417272be14d88dbeebd81b287d4e1bd77db1 |
| | Q | 7d4e1b287db11bd714d872beebd88dbebe7227ebbe8d2714281bb182d71b4e62 |

TABLE 44

$f(X) = 1 + X + X^2 + X^3 + X^5 + X^6 + X^7$
$g(X) = 3 + 3X + X^2 + X^3 + 2X^4 + 3X^5 + X^6 + X^7$

| | | |
|---|---|---|
| e1 | I | 1b7d1b822741d8418d147214b128b1d7 |
| | Q | 148d1472d74e284e7d1b821bbed8be27 |
| e2 | I | 771e117887111e887811e18877e11187 |
| | Q | 4bdd2dbbbbd2224b44d2dd4b4b222d44 |
| e3 | I | 128b1d8474ed841dd148de4748d1b821 |
| | Q | 4721b7d1deb8d1b784e27412e284ed8b |
| e4 | I | 411be44172d728727d272782b114144e |
| | Q | 1b41be1b288d7228277d7dd8eb4e4e14 |

The above quaternary complex quasi-orthogonal codes can be used for every link in the CDMA system using the Walsh orthogonal codes. When the quaternary complex quasi-orthogonal codes are used together with the orthogonal codes, the following three options can be considered.

Option 1

In a system using the Walsh orthogonal codes and providing a service at a variable data rate, it is possible to freely use the quaternary complex quasi-orthogonal codes without restriction on the length. Further, it is possible to use every quaternary complex quasi-orthogonal code sequences at full length.

Option 2

One of a Walsh orthogonal code group and a quaternary complex quasi-orthogonal code group is selected to make two orthogonal sets, and the two groups both can provide a service at the variable data rate.

Option 3

It is possible to use the Walsh orthogonal code group and every quaternary complex quasi-orthogonal code group as one group to allow every code group to support the variable data rate. In this case, there may occur a random code characteristic between the quaternary complex quasi-orthogonal code groups.

It is preferable to use the quaternary complex quasi-orthogonal codes according to the types of application, taking into consideration the above three options. In general, when only the Walsh codes are used, the modulating side exchanges a predetermined orthogonal code number with the demodulating side. Therefore, when the orthogonal codes and the quaternary complex quasi-orthogonal codes are used, it is necessary to exchange a predetermined orthogonal code number and a group number (i.e., an index i of the Q' matrix $e_i(t)$ shown in FIG. 4). In this case, the orthogonal code group is defined as a Group 0, and subsequently, the group numbers are redefined up to $2^m-1$.

A description will now be made regarding a method for applying the quaternary complex quasi-orthogonal code group to a system supporting the variable data rate, like the orthogonal code group. An element of the quaternary complex quasi-orthogonal code group are comprised of a Walsh number corresponding to the orthogonal code number and a quaternary complex quasi-orthogonal code mask corresponding to the group number. The group number indicates which $e_i(t)$ is selected in FIG. 4. To service the variable data rate using the quaternary complex quasi-orthogonal code group, a previously allocated orthogonal code number is used as a Walsh orthogonal code number and then, allocated $e_i(t)$ is added to it every length N. At this point, when signals are expressed with "0" and "1", addition is performed; when signals are expressed with "1" and "−1", multiplication is performed.

Figure 6:
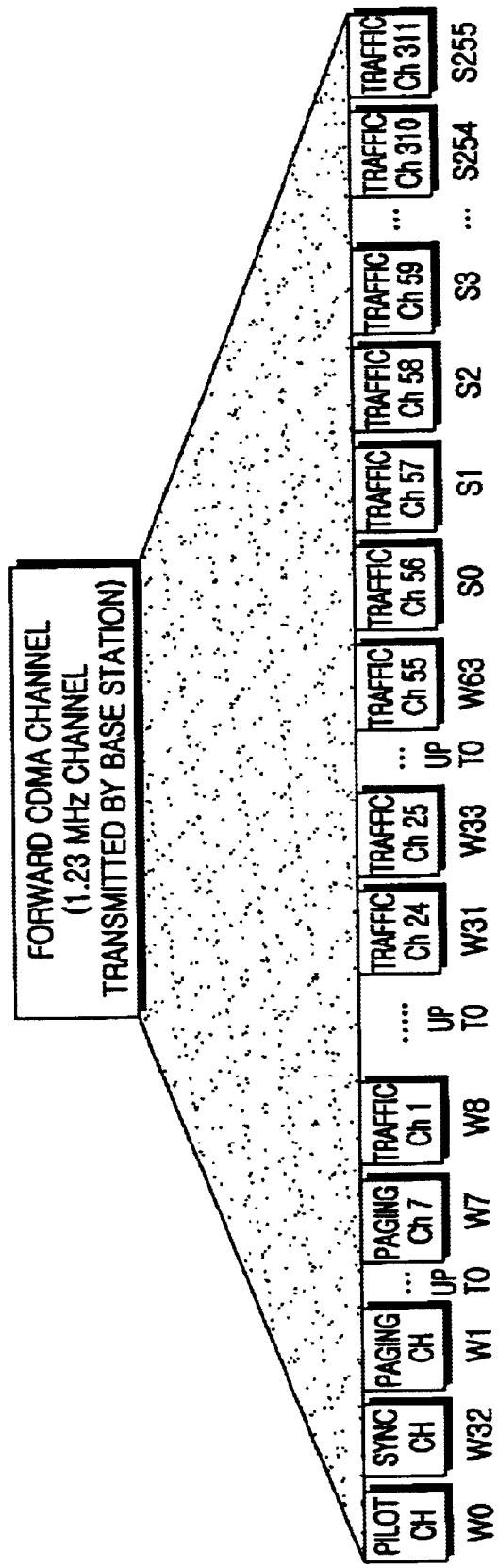
FIG. 6 is a diagram illustrating channel separation using Walsh orthogonal codes and quasi-orthogonal codes in a CDMA communication system according to an embodiment of the present invention.

FIG. 6 illustrates a channel separation method using the Walsh orthogonal codes and the quaternary complex quasi-orthogonal codes in an IS-95/IS-95A forward link to extend the channel capacity according to an embodiment of the present invention. FIG. 6 shows an exemplary embodiment where the channels which can be assigned with the Walsh orthogonal codes are used in the same method as in the IS-95 system, and the quaternary complex quasi-orthogonal codes are used to expand the channel capacity. However, it is also possible to assign the Walsh orthogonal codes to common channels and assign the remaining Walsh orthogonal codes and the quaternary complex quasi-orthogonal codes to traffic channels. Here, the traffic channels refer to dedicated channels. In addition, although FIG. 6 shows an embodiment which uses the quaternary complex quasi-orthogonal codes of length 256, the quaternary complex quasi-orthogonal codes can be varied in length, when necessary.

In FIG. 6, Walsh orthogonal codes are represented by Wi (where i=0,1, . . . , 63), and respective channels are separated by previously allocated unique orthogonal codes. Further, in FIG. 6, quaternary complex quasi-orthogonal codes are represented by Sj (where j=0,1, . . . , 255), and are assigned to the traffic channels. As illustrated, an IS-95/IS-95A forward link can separate 64 channels using the Walsh orthogonal codes, and 256 channels, which is 4 times the number of the Walsh orthogonal codes, using the quaternary complex quasi-orthogonal codes. Therefore, it is possible to expand the channels five times by using the Walsh orthogonal codes and the quaternary complex quasi-orthogonal codes.

Figure 7:
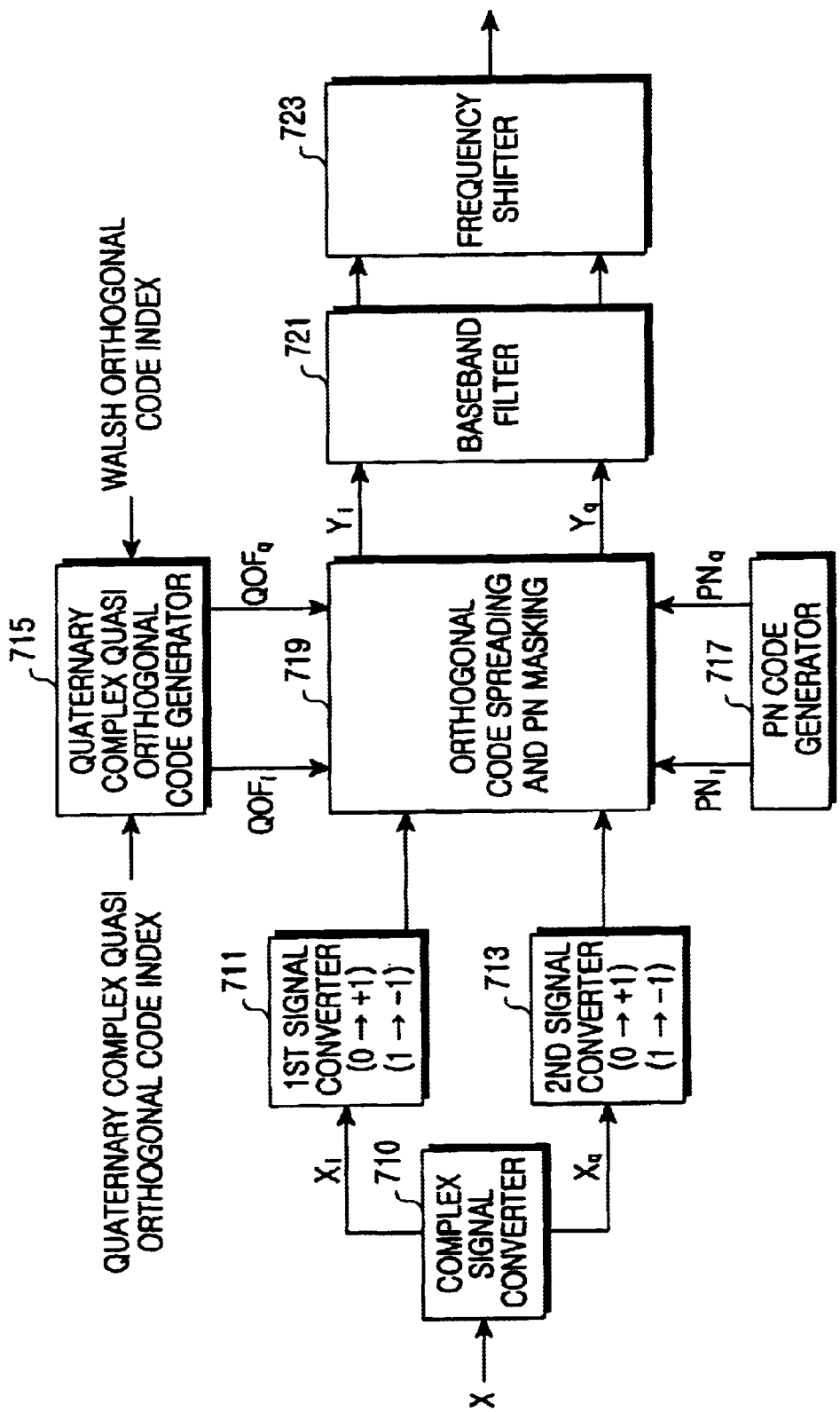
FIG. 7 is a block diagram illustrating a channel spreading device which uses quaternary complex quasi-orthogonal codes, in a CDMA communication system according to an embodiment of the present invention.

FIG. 7 illustrates a transmitter for a mobile communication system, including a spreader which uses Walsh orthogonal code and quaternary complex quasi-orthogonal codes according to an embodiment of the present invention. Unlike the IS-95 system, the mobile communication system of FIG. 7 includes a channel transmitter which uses the quaternary complex quasi-orthogonal codes for channel spreading codes.

Referring to FIG. 7, a complex signal converter 710 converts an input data bit stream to complex signals and divides the complex signal into a real signal Xi and an imaginary signal Xq. First and second signal converters (or signal mappers) 711 and 713 convert the complex data bit streams Xi and Xq output from the complex signal converter 710, respectively. More specifically, the first signal converter 711 converts the input bit stream Xi by converting a bit "0" to "+1" and a bit "1" to "−1", and demultiplexes the converted signal to an orthogonal code spreading and PN masking part 719. The, second signal converter 713 converts the input bit stream Xq by converting a bit "0" to "+1" and a bit "1" to "−1", and demultiplexes the converted signal to the orthogonal code spreading and PN masking part 719.

A quaternary complex quasi-orthogonal code generator 715 receives complex quasi-orthogonal code indexes and Walsh orthogonal code indexes, and generates complex quasi-orthogonal function codes QOFi and QOFq. The quaternary complex quasi-orthogonal code generator 715 stores therein quasi-orthogonal code masks generated and selected in the process of FIG. 5, and selects a mask according to the quaternary complex quasi-orthogonal code index. Further, the quaternary complex quasi-orthogonal code generator 715 includes a Walsh orthogonal code generator to generate a Walsh orthogonal code according to the Walsh orthogonal code index. Thereafter, the quaternary complex quasi-orthogonal code generator 715 uses the selected quasi-orthogonal code mask and the Walsh orthogonal code to generate complex quasi-orthogonal codes QOFi and QOFq.

A PN code generator 717 generates a real PN code PNi and an imaginary PN code PNq, and applies the generated PN codes to the orthogonal code spreading and PN masking part 719. The orthogonal code spreading and PN masking part 719 spreads the signals output from the first and second signal converters 711 and 713 by multiplying the output signals by the quaternary complex quasi-orthogonal codes QOFi and QOFq and then PN-masks the spread signals by multiplying the spread signals by the real and imaginary PN codes PNi and PNq, thereby generating output signals Yi and Yq. A baseband filter 721 baseband-filters the spread signals Yi and Yq output from the orthogonal code spreading and PN masking part 719. A frequency shifter 723 converts the signals output from the baseband filter 721 to an RF (Radio Frequency) signal.

Figure 8:
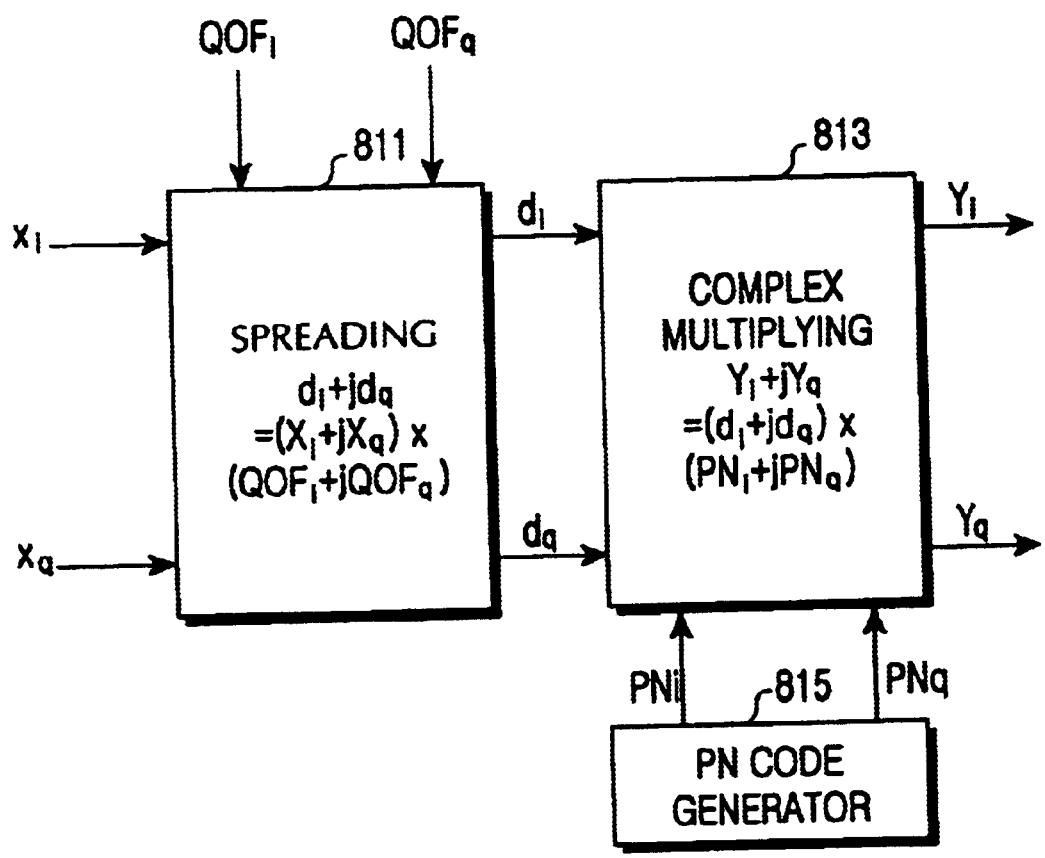
FIG. 8 is a block diagram illustrating a spreading and PN masking part (719) of FIG. 7 for quaternary complex quasi-orthogonal codes.

FIG. 8 illustrates the channel spreading and PN masking part 719 of FIG. 7, which performs channel spreading using the quaternary complex quasi-orthogonal codes QOFi and QOFq and performs PN masking using the complex PN codes PNi and PNq.

Referring to FIG. 8, a spreader 811 multiplies the complex channel signals Xi and Xq by the quaternary complex quasi-orthogonal codes QOFi and QOFq, respectively, to output channel spread signals di and dq. The signals, di+dq, output from the spreader 811, which were spread with the quaternary complex quasi-orthogonal codes, become (Xi+jXq)*(QOFi+jQOFq). A complex multiplier 813 multiplies the spread signals di and dq output from the spreader 811 by the PN codes PNi and PNq to output PN masked signals Yi and Yq. The output signals of the complex multiplier 813 become Yi+jYq=(di+jdq)*(PNi+jPNq). The complex multiplier 813 performs complex PN masking.

Figure 10:
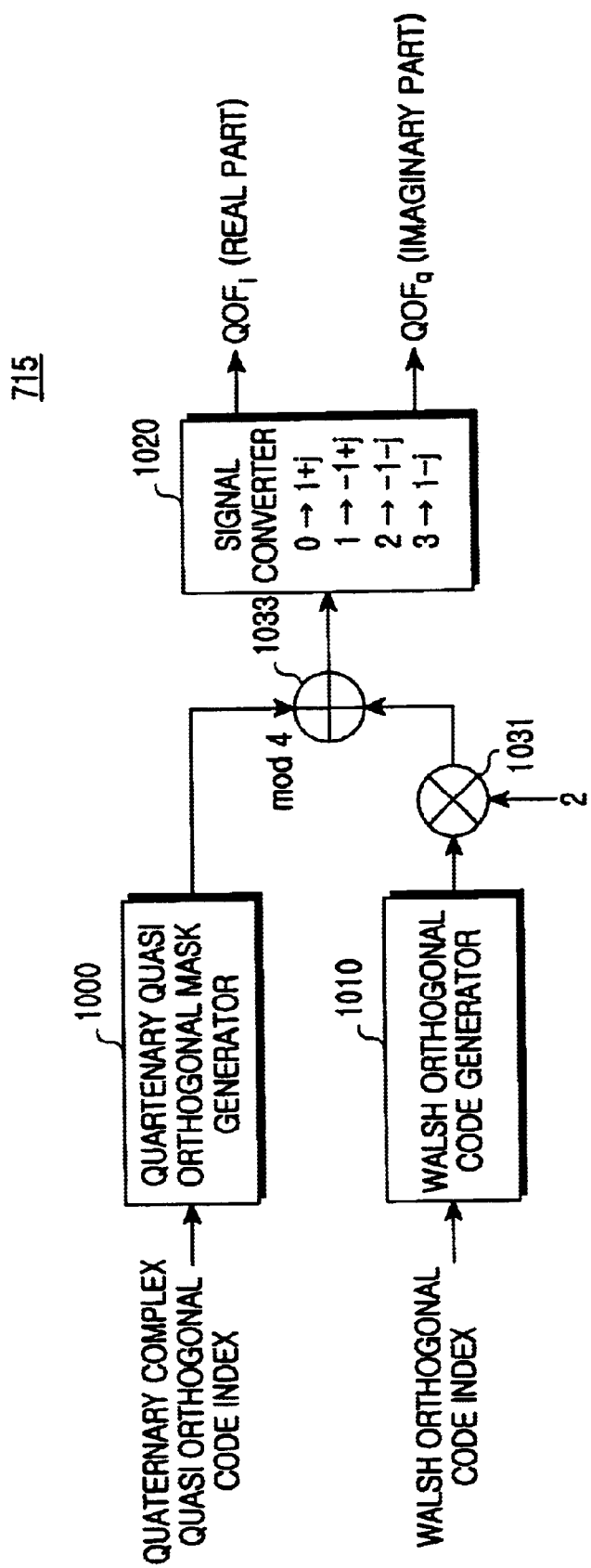
FIG. 10 is a block diagram illustrating a quaternary complex quasi-orthogonal code generator (715) of FIG. 7, which generates quasi-orthogonal code masks in quaternary numbers as shown in Table 9.
Figure 11:
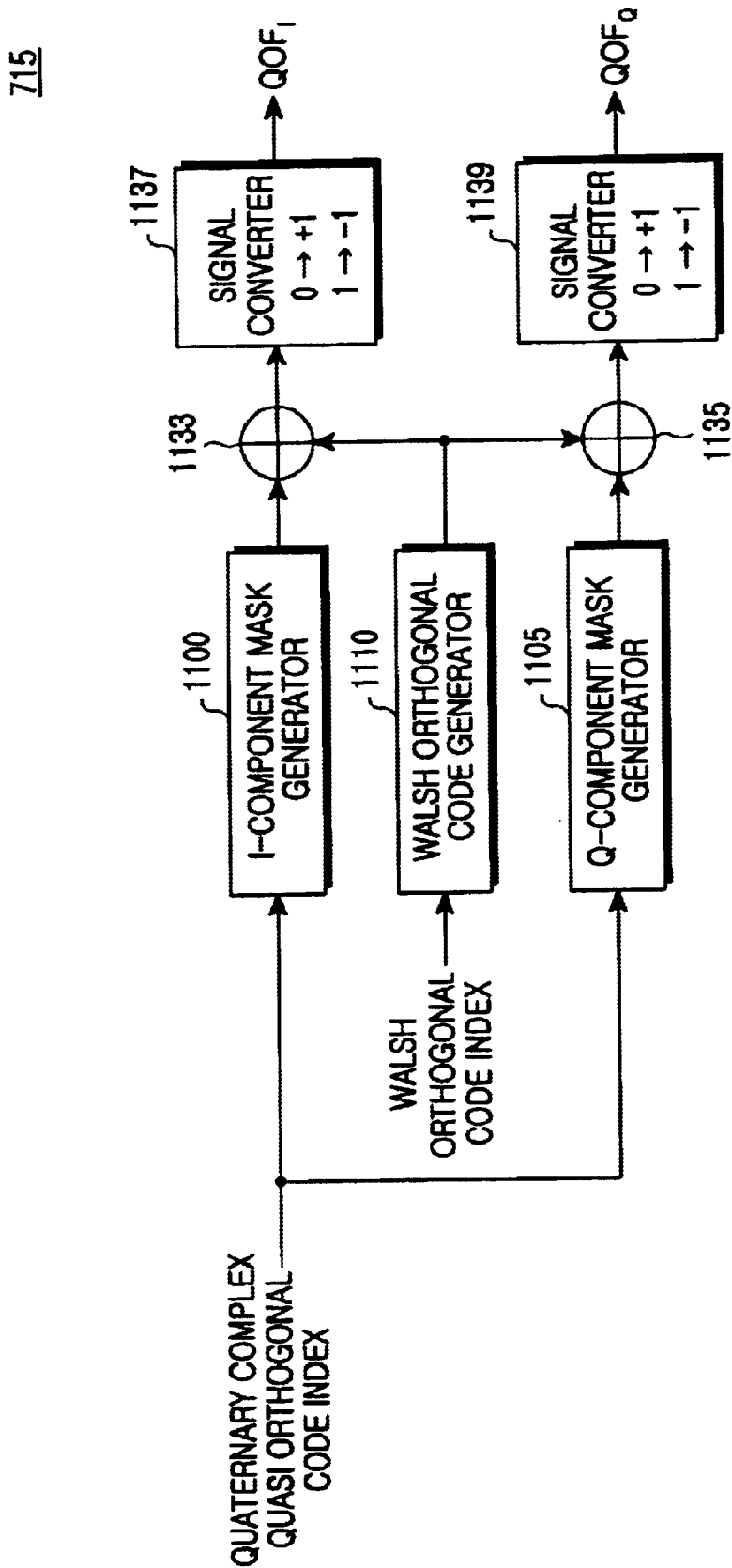
FIG. 11 is a block diagram illustrating a quaternary complex quasi-orthogonal code generator (715) of FIG. 7, which generates quasi-orthogonal code masks in I and Q values as shown in Table 43.

FIGS. 10 and 11 illustrate the quaternary complex quasi-orthogonal code generator 715 of FIG. 7 according to different embodiments of the present invention. The quaternary complex quasi-orthogonal code generator 715 can be differently constructed according to the structure of the mask. That is, the quaternary complex quasi-orthogonal code generator 715 can be differently constructed according to whether the output mask will be generated with quaternary values, with I and Q components, or with sign and direction components. FIG. 10 illustrates the quaternary complex quasi-orthogonal code generator 715, which generates quasi-orthogonal code masks in quaternary values as shown in Table 9, and FIG. 11 illustrates a quaternary complex quasi-orthogonal code generator 715, which generates quasi-orthogonal code masks in I and Q values as shown in Table 43.

Referring to FIG. 10, upon receipt of a quaternary quasi-orthogonal code index, a quaternary quasi-orthogonal mask generator 1000 generates a quaternary quasi-orthogonal mask according to the quaternary quasi-orthogonal code index. Also, the quaternary quasi-orthogonal mask generator 1000 may directly generate a mask using the quaternary quasi-orthogonal code index. Further, the quaternary quasi-orthogonal mask generator 1000 can store quaternary quasi-orthogonal code masks, and selectively outputs a mask corresponding to the received quaternary quasi-orthogonal code index. Upon receipt of a Walsh orthogonal code index, a Walsh orthogonal code generator 1010 generates a Walsh orthogonal code corresponding to the Walsh orthogonal code index. At this point, the Walsh orthogonal code is output with the values of "0" and "1". A multiplier 1031 then multiplies the Walsh orthogonal code output from the Walsh orthogonal code generator 1010 by "2" to express the Walsh orthogonal code in a quaternary number, and provides its output to an adder 1033. The adder 1033 then adds the quaternary quasi-orthogonal code mask output from the quaternary quasi-orthogonal mask generator 1000 and the Walsh orthogonal code output from the multiplier 1031. At this moment, the adder 1033 performs quaternary addition for the two input signals, since the two input signals are both quaternary signals. A signal converter 1020 receiving the signals output from the adder 1033 converts the quaternary quasi-orthogonal code to a quaternary complex quasi-orthogonal code, by converting "0" to "1+j", "1" to "−1+j", "2" to "−1−j" and "3" to "1−j" and then outputting a real part as a I signal QOFi and an imaginary part as a Q signal QOFq.

Referring to FIG. 11, upon receipt of a quaternary quasi-orthogonal code index, an I-component mask generator 1100 and a Q-component mask generator 1105 generate I- and Q-component masks, expressed with "0" and "1", corresponding to the quaternary quasi-orthogonal code index, respectively. The I- and Q-component masks output from the mask generators 1100 and 1105 are applied to adders 1133 and 1135, respectively. Further, upon receipt of a Walsh orthogonal code index, a Walsh orthogonal code generator 1110 generates a Walsh orthogonal code corresponding to the Walsh orthogonal code index and provides the generated Walsh orthogonal code to the adders 1133 and 1135. As a result, the adders 1133 adds the I-component mask and the Walsh orthogonal code to generate an I-component quasi-orthogonal code, and the adder 1135 adds the Q-component mask and the Walsh orthogonal code to generate a Q-component quasi-orthogonal code.

As described above, the embodiment of the present invention can generate quaternary complex quasi-orthogonal codes giving the least interference with the orthogonal codes. In addition, it is possible to expand the channel capacity without restriction on the number of the orthogonal codes by using the quaternary complex quasi-orthogonal codes in a mobile communication system which performs channel separation using the orthogonal codes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a quaternary complex quasi-orthogonal code in a code division multiple access (CDMA) communication system, comprising the steps of:

generating an M-sequence and generating specific sequences having a square root of the full length as a full correlation bound with the M-sequence;

generating candidate masks by column permutation, in the same manner as a column permutation that converts the M-sequence to a Walsh code, of specific sequences;

generating quasi-orthogonal code representatives by operating the candidate masks and Walsh codes having the same length as that of the candidate masks; and selecting a quasi-orthogonal code satisfying a partial correlation with the Walsh codes, out of the generated quasi-orthogonal code representatives, and selecting a mask related to generation of the selected quasi-orthogonal code.

2. The method as claimed in claim 1, wherein the specific sequence is a Kerdock sequence for generating a quaternary complex quasi-orthogonal code mask.

3. The method as claimed in claim 2, wherein the candidate mask generating step comprises the steps of:

shifting the specific sequence to generate at least two shifted specific sequences; and column permuting the specific sequence and the shifted specific sequences with the column permutation function to generate the candidate masks.

4. The method as claimed in claim 3, wherein the specific sequence shifting step comprises the step of:

inserting 0 at the head of the two shifted specific sequences.

5. The method as claimed in claim 2, wherein the column permutation function is σ: $\{0,1,2,\ldots,2^m-2\} \rightarrow \{1,2,3,\ldots,2^m-1\}$, where $$\sigma(t) = \sum_{s=0}^{m-1} M(t+s)2^{m-1-s}.$$

6. The method as claimed in claim 2, wherein in the mask selecting step, a mask for generating the quaternary quasi-orthogonal code candidate is selected as the quaternary complex quasi-orthogonal code mask, when a correlation value for respective parts of a length N/M, where N is the whole length of the quaternary complex quasi-orthogonal code candidate and the Walsh orthogonal code, does not exceed $$\sqrt{\frac{N}{M}},$$

where $M=2^m$, m=0,1,...,$\log_2 N$.

7. The method as claimed in claim 6, wherein the mask selecting step further comprises the step of:

storing said mask for generating the quaternary quasi-orthogonal code candidate as the quaternary complex quasi-orthogonal code mask, when a correlation value for respective parts of a length N/M, where N is the whole length of a quaternary complex quasi-orthogonal code candidate generated with the mask selected and another quaternary complex quasi-orthogonal code, does not exceed $$\sqrt{\frac{N}{M}},$$

where $M=2^m$, m=0,1,...,$\log_2 N$.

8. A channel transmission device for a code division multiple access (CDMA) communication system, comprising:

a generator including a quaternary complex quasi-orthogonal code mask, for generating a quaternary complex quasi-orthogonal code by applying the quaternary complex quasi-orthogonal code mask to a Walsh code wherein the quaternary quasi-orthogonal code mask is featured in that a correlation value for respective parts of a length N/M, where N is the whole length of said quaternary complex quasi-orthogonal code and another quaternary complex quasi-orthogonal code, does not exceed $$\sqrt{\frac{N}{M}},$$

where $M=2^m$, m=0,1,...,$\log_2 N$;

a channel spreader for generating a channel spread signal by operating on the converted complex signal and the quaternary complex quasi-orthogonal code; and a PN (Pseudo Noise) masking part for generating a PN masked channel signal by operating on the channel spread complex signal and complex PN sequences.

9. The channel transmission device as claimed in claim 8, wherein the quaternary quasi-orthogonal code mask is featured in that a full correlation value between a Walsh code and the quaternary complex quasi-orthogonal code having the whole length N does not exceed √N, a full correlation value between the quaternary complex quasi-orthogonal code and another quaternary complex quasi-orthogonal code does not exceed √N, a correlation value for respective parts of a length N/M, where N is the whole length of the quaternary complex quasi-orthogonal code candidate and the Walsh orthogonal code, does not exceed $$\sqrt{\frac{N}{M}},$$

where $M=2^m$, $m=0,1,\ldots,\log_2 N$.

10. The channel transmission device as claimed in claim 8, wherein the quaternary complex quasi-orthogonal code generator comprises:

a first generator for generating a quaternary quasi-orthogonal code mask corresponding to a designated code index;

a second generator for generating a Walsh code corresponding to a designated Walsh orthogonal code index;

an adder for generating a quaternary quasi-orthogonal code by adding the quaternary quasi-orthogonal code mask and a Walsh orthogonal code; and a signal converter for converting the quaternary quasi-orthogonal code to a quaternary complex quasi-orthogonal code.

11. The channel transmission device as claimed in claim 10, wherein the second generator comprises an operator for converting the Walsh orthogonal code to a quaternary number.

12. The channel transmission device as claimed in claim 10, wherein the first generator comprises a quaternary quasi-orthogonal code mask table given as follows:

| | $f(X) = 1 + X + X^2 + X^3 + X^5 + X^6 + X^7$ $g(X) = 3 + 3X + X^2 + X^3 + 2X^4 + 3X^5 + X^6 + X^7$ | | | | | | | |
|---|---|---|---|---|---|---|---|---|
| e1 | 00021311 | 31112202 | 00021311 | 13330020 | 33130222 | 02003331 | 11312000 | 02003331 |
| | 13332202 | 00023133 | 31110020 | 00023133 | 20223331 | 33132000 | 20223331 | 11310222 |
| e2 | 02113122 | 33022213 | 00313302 | 31222033 | 20333122 | 33020031 | 00311120 | 13002033 |
| | 02111300 | 33020031 | 22133302 | 13002033 | 02113122 | 11200031 | 00313302 | 13000211 |
| e3 | 03010323 | 10301012 | 30321232 | 23030103 | 32123230 | 21232101 | 23030103 | 30321232 |
| | 21010301 | 32301030 | 12321210 | 01030121 | 32301030 | 21010301 | 23212303 | 30103032 |
| e4 | 01033032 | 03011012 | 21233230 | 01033032 | 01213010 | 21013212 | 03231030 | 01213010 |
| | 01211232 | 03233212 | 03233212 | 23033010 | 23213032 | 03013230 | 03013230 | 01031210 |

13. The channel transmission device as claimed in claim 12, wherein the signal converter converts a signal "0" to "1+j", a signal "1" to "−1+j", a signal "2" to "−1−j" and a signal "3" to "1−j".

14. The channel transmission device as claimed in claim 10, wherein the first generator outputs a quaternary quasi-orthogonal code mask corresponding to the code index in a mask table given as follows:

| | $f(X) = 1 + X^3 + X^5 + X^7 + X^8$ $g(X) = 1 + 3X^3 + X^5 + 2X^6 + 3X^7 + X^8$ | | | | | | | |
|---|---|---|---|---|---|---|---|---|
| e1 | 03233212 | 01211232 | 32300301 | 30322321 | 21011030 | 23033010 | 32300301 | 30322321 |
| | 32122101 | 12322303 | 21233230 | 01033032 | 32122101 | 12322303 | 03011012 | 23211210 |
| | 12102321 | 32302123 | 23031232 | 03231030 | 12102321 | 32302123 | 01213010 | 21013212 |
| | 01031210 | 03013230 | 12320121 | 10302101 | 23213032 | 21231012 | 12320121 | 10302101 |
| e2 | 02332213 | 13221120 | 00130211 | 11023122 | 22130233 | 33023100 | 20332231 | 31221102 |
| | 02330031 | 13223302 | 22310211 | 33203122 | 00310233 | 11203100 | 20330013 | 31223320 |
| | 20112213 | 13223302 | 22310211 | 11021300 | 22132011 | 11203100 | 20330013 | 13001102 |
| | 02332213 | 31003302 | 22312033 | 11023122 | 22130233 | 11201322 | 02110013 | 31221102 |
| e3 | 03323001 | 10210130 | 23123203 | 30010332 | 12230332 | 23121021 | 32030130 | 03321223 |
| | 12012132 | 23303221 | 32212330 | 03103023 | 21323023 | 32210112 | 01123221 | 12010310 |
| | 01123221 | 12010310 | 21323023 | 32210112 | 10030112 | 21321201 | 30230310 | 01121003 |
| | 32030130 | 03321223 | 12230332 | 23121021 | 01301021 | 12232110 | 21101223 | 32032312 |
| e4 | 02332213 | 02112231 | 11023122 | 11203100 | 13223302 | 31221102 | 00132033 | 22130233 |
| | 11021300 | 33023100 | 02330031 | 20332231 | 22312033 | 22132011 | 31003302 | 31223320 |
| | 31223320 | 13221120 | 00310233 | 22312033 | 20332231 | 20112213 | 11201322 | 11021300 |
| | 00312011 | 00132033 | 31221102 | 31001120 | 33021322 | 11023122 | 02112231 | 20110031 |

15. The channel transmission device as claimed in claim 13, wherein the signal converter converts a signal "0" to "1+j", a signal "1" to "−1+j", a signal "2" to "−1−j" and a signal "3" to "1−j".

16. The channel transmission device as claimed in claim 8, wherein the quaternary complex quasi-orthogonal code generator comprises:
   a first generator for generating I- and Q-component quaternary quasi-orthogonal code masks corresponding to a designated code index;
   a second generator for generating a Walsh orthogonal code corresponding to a designated Walsh orthogonal code index;
   an adder for generating I- and Q-component quaternary quasi-orthogonal codes by operating the I- and Q-component quaternary quasi-orthogonal code masks and the Walsh orthogonal code; and
   a signal converter for converting the I- and Q-component quaternary quasi-orthogonal codes to I- and Q-component quaternary complex quasi-orthogonal codes.

17. The channel transmission device as claimed in claim 16, wherein the first generator comprises I and Q-component quaternary quasi-orthogonal code masks, given in the following table, corresponding to the code index and selects I- and Q-component quaternary quasi-orthogonal code masks corresponding to the designated code index.

| $f(X) = 1 + X + X^2 + X^3 + X^5 + X^6 + X^7$ | | |
|---|---|---|
| $g(X) = 3 + 3X + X^2 + X^3 + 2X^4 + 3X^5 + X^6 + X^7$ | | |
| e1 | I | 1b7d1b822741d8418d147214b128b1d7 |
|    | Q | 148d1472d74e284e7d1b821bbed8be27 |
| e2 | I | 771e117887111e887811e18877e11187 |
|    | Q | 4bdd2dbbbbd2224b44d2dd4b4b222d44 |
| e3 | I | 128b1d8474ed841dd148de4748d1b821 |
|    | Q | 4721b7d1deb8d1b784e27412e284ed8b |
| e4 | I | 411be44172d728727d272782b114144e |
|    | Q | 1b41be1b288d7228277d7dd8eb4e4e14 |

18. The channel transmission device as claimed in claim 16, wherein the first generator comprises I and Q-component quaternary quasi-orthogonal code masks, given in the following table, corresponding to the code index and selects I- and Q-component quaternary quasi-orthogonal code masks corresponding to the designated code index.

| $f(X) = 1 + X^3 + X^5 + X^7 + X^8$ | | |
|---|---|---|
| $g(X) = 1 + 3X^3 + X^5 + 2X^6 + 3X^7 + X^8$ | | |
| e1 | I | 277d411bd882411b7dd8e4417dd81bbeeb4e8d28eb4e72d74e14d78db1ebd78d |
|    | Q | 7d27e4be82d8e4bed87dbe1bd87d41e44eebd7724eeb288d144e7228ebb17228 |
| e2 | I | 4ebe27d7e4148d7d41b1d72714e48272beb1d7d8ebe4828d4e41d8d7e4eb727d |
|    | Q | 7d72141bd7d8beb1727de4eb2728b1be8d7de414d828b1417d8deb1bd72741b1 |
| e3 | I | 11b4b411e1bb441edd877822d27777d277d2d27787dd2278441ee1bb4beeee4b |
|    | Q | 7822dd8777d2d2774beeee4bbbe11e441e44bbe111b4b411d27777d2227887dd |
| e4 | I | 4e7dd7e4b17d28e4d814418dd8eb417272be14d88dbeebd81b287d4e1bd77db1 |
|    | Q | 7d4e1b287db11bd714d872beebd88dbebe7227ebbe8d2714281bb182d71b4e82 |

19. A quaternary complex quasi-orthogonal code generation device for a channel transmission device in a code division multiple access (CDMA) communication system, which spreads a channel signal using a quaternary complex quasi-orthogonal code, comprising:
   a first generator for generating a quaternary quasi-orthogonal code mask corresponding to a designated code index wherein the quaternary quasi-orthogonal code mask is featured in that a correlation value for respective parts of a length N/M, where N is the whole length of said quaternary complex quasi-orthogonal code and another quaternary complex quasi-orthogonal code, does not exceed $$\sqrt{\frac{N}{M}},$$

where $M=2^m$, $m=0,1,\ldots,\log_2 N$;
   a second generator for generating a Walsh orthogonal code corresponding to a designated Walsh orthogonal code index; and
   an adder for generating a quaternary quasi-orthogonal code by operating the quaternary quasi-orthogonal code mask and the Walsh orthogonal code.

20. A quaternary complex quasi-orthogonal code generation device for a channel transmission device in a code division multiple access (CDMA) communication system, which spreads a channel signal using a quaternary complex quasi-orthogonal code, comprising:
   a first generator for generating I- and Q-component quaternary quasi-orthogonal code masks corresponding to a designated code index wherein the quaternary quasi-orthogonal code mask is featured in that a correlation value for respective parts of a length N/M, where N is the whole length of said quaternary complex quasi-orthogonal code and another quaternary complex quasi-orthogonal code, does not exceed $$\sqrt{\frac{N}{M}},$$

where $M=2^m$, $m=0,1,\ldots,\log_2 N$;
   a second generator for generating a Walsh orthogonal code corresponding to a designated Walsh orthogonal code index; and
   an adder for generating I- and Q-component quaternary quasi-orthogonal codes by adding the I- and Q-component quaternary quasi-orthogonal code masks and the Walsh orthogonal code.

21. A channel transmission method for a code division multiple access (CDMA) communication system, comprising the steps of:

generating a quaternary quasi-orthogonal code mask corresponding to a designated code index, and generating a quaternary complex quasi-orthogonal code by using the generated quasi-orthogonal code mask and the Walsh orthogonal code wherein the quaternary quasi-orthogonal code mask is featured in that a correlation value for respective parts of a length N/M, where N is the whole length of said quaternary complex quasi-orthogonal code and another quaternary complex quasi-orthogonal code, does not exceed $$\sqrt{\frac{N}{M}},$$

where $M=2^m$, $m=0,1,\ldots,\log_2 N$;

generating a channel spread signal by using the converted complex signals and the quaternary complex quasi-orthogonal codes; and generating PN masked channel signals by using the channel spread complex signals and complex PN sequences.

22. A quaternary complex quasi-orthogonal code generation method for a channel transmission device in a code division multiple access (CDMA) communication system, which spreads a channel signal using a quaternary complex quasi-orthogonal code, comprising the steps of:

generating a quaternary quasi-orthogonal code mask corresponding to a designated code index wherein the quaternary quasi-orthogonal code mask is featured in that a correlation value for respective parts of a length N/M, where N is the whole length of said quaternary complex quasi-orthogonal code and another quaternary complex quasi-orthogonal code, does not exceed $$\sqrt{\frac{N}{M}},$$

where $M=2^m$, $m=0,1,\ldots,\log_2 N$;

generating a Walsh code corresponding to a designated Walsh orthogonal code index; and generating a quaternary quasi-orthogonal code by using the quaternary quasi-orthogonal code mask and the Walsh orthogonal code.

23. A quaternary complex quasi-orthogonal code generation method for a channel transmission device in a code division multiple access (CDMA) communication system, which spreads a channel signal using a quaternary complex quasi-orthogonal code, comprising the steps of:

generating I- and Q-component quaternary quasi-orthogonal code masks corresponding to a designated code index wherein the quaternary quasi-orthogonal code mask is featured in that a correlation value for respective parts of a length N/M, where N is the whole length of said quaternary complex quasi-orthogonal code and another quaternary complex quasi-orthogonal code, does not exceed $$\sqrt{\frac{N}{M}},$$

where $M=2^m$, $m=0,1,\ldots,\log_2 N$;

generating a Walsh code corresponding to a designated Walsh orthogonal code index; and generating I- and Q-component quaternary quasi-orthogonal codes by using the I- and Q-component quaternary quasi-orthogonal code masks and the Walsh orthogonal code.

\* \* \* \* \*